US012713449B2

(12) United States Patent
Lee et al.

(10) Patent No.: US 12,713,449 B2
(45) Date of Patent: Aug. 18, 2026

(54) SMALL DELAY CYCLIC DELAY DIVERSITY FOR DATA OR CONTROL CHANNELS

(71) Applicant: QUALCOMM Incorporated, San Diego, CA (US)

(72) Inventors: Hyojin Lee, San Diego, CA (US); Yu Zhang, San Diego, CA (US); Jing Jiang, San Diego, CA (US); Jing Sun, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 322 days.

(21) Appl. No.: 18/525,730

(22) Filed: Nov. 30, 2023

(65) Prior Publication Data

US 2025/0185042 A1 Jun. 5, 2025

(51) Int. Cl.

| | |
|---|---|
| ***H04W 28/02*** | (2009.01) |
| ***H04W 72/20*** | (2023.01) |
| ***H04W 72/30*** | (2023.01) |

(52) U.S. Cl.

CPC ........... *H04W 72/30* (2023.01); *H04W 72/20* (2023.01)

(58) Field of Classification Search

CPC ............. H04L 25/0204; H04L 25/0212; H04L 25/0216; H04L 25/0222; H04L 25/0224; H04W 72/20; H04W 72/30

See application file for complete search history.

(56) References Cited

U.S. PATENT DOCUMENTS

| | | | | |
|---|---|---|---|---|
| 2008/0132282 | A1* | 6/2008 | Liu | H04B 7/0671 455/562.1 |
| 2022/0190892 | A1* | 6/2022 | Park | H04L 27/26 |
| 2025/0192854 | A1* | 6/2025 | Frank | H04L 5/0007 |

FOREIGN PATENT DOCUMENTS

| | | | | | |
|---|---|---|---|---|---|
| CN | 101174925 | A * | 5/2008 | | |
| CN | 101800713 | A | 8/2010 | | |
| WO | WO-2008098092 | A2 * | 8/2008 | | H04B 7/0473 |

OTHER PUBLICATIONS

International Search Report and Written Opinion—PCT/US2024/051849—ISA/EPO—Jan. 30, 2025.

Zte, et al., "Discussion on Transmit Diversity for PC5", 3GPP TSG RAN WG1 Meeting #91, R1-1719657, 3GPP Draft, 6.2.3.3.1 Discussion on Transmit Diversity for PC5, 3rd Generation Partnership Project, Mobile Competence Centre, 650, Route Des Lucioles, F-06921, Sophia-Antipolis CE, vol. RAN WG1, No. Reno, USA, Nov. 27-Dec. 1, 2017, Nov. 17, 2017, XP051368836, 9 Pages, The Whole Document.

* cited by examiner

*Primary Examiner* — Phuc H Tran

(74) *Attorney, Agent, or Firm* — Holland & Hart LLP

(57) ABSTRACT

Methods, systems, and devices for wireless communications are described. A user equipment (UE) may first delay value associated with a small delay cyclic delay diversity (CDD) scheme for a broadcast channel. In some examples, the first delay value may be selected from a set of candidate delay values based on a frequency band associated with the broadcast channel. The UE may perform channel estimation for the broadcast channel in accordance with one or more delay spread values associated with a multi-path profile of the broadcast channel, where the one or more delay spread values are based at least in part on the first delay value associated with the small delay CDD scheme. The UE may receive a message via the broadcast channel based at least in part on performing the channel estimation.

29 Claims, 16 Drawing Sheets

SMALL DELAY CYCLIC DELAY DIVERSITY FOR DATA OR CONTROL CHANNELS

FIELD OF TECHNOLOGY

The following relates to wireless communications, including small delay cyclic delay diversity for data or control channels.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UE). In some examples, a UE may perform channel estimation to receive one or more messages via the channel from a network entity.

SUMMARY

The described techniques relate to improved methods, systems, devices, and apparatuses that support small delay cyclic delay diversity for data or control channels. For example, the described techniques provide for a user equipment to determine a delay value for a small delay cyclic delay diversity (CDD) scheme. Based on the delay value, the UE may determine one or more delay spread values associated with a multi-path profile of a channel. As such, the UE may perform channel estimation for the channel based on the one or more delay spread values, which may support the UE receiving a message via the channel. In some examples, such as for a physical broadcast channel (PBCH), the UE may be configured with a delay value or a range of delay values that are based on a frequency band of the PBCH. In some cases, a delay value for a downlink control channel (e.g., CORESET 0) scheduling a system information block (SIB) (e.g., SIB1) may be the same as the delay value for the PBCH. Additionally, or alternatively, the UE may receive an indication of the delay value for the downlink control channel via a PBCH. In some examples, for a broadcast data channel (e.g., an SIB), a corresponding delay value may be indicated by a downlink control channel that schedules the broadcast data channel, and the delay value may be selected from set of frequency-band specific delay values. In some examples, such as for common search space (CSS), UE-specific search space (USS), and unicast data channels, the UE may receive a first control message indicating a set of candidate delay values. The UE may then receive a second control message indicating an active delay value for performing channel estimation. As such, the UE may obtain delay values corresponding to different channel types, and the UE may perform channel estimation accordingly to successfully receive a message.

A method for wireless communication by a UE is described. The method may include obtaining a first delay value associated with a small delay CDD scheme for a broadcast channel, performing channel estimation for the broadcast channel in accordance with one or more delay spread values associated with a multi-path profile of the broadcast channel, where the one or more delay spread values are based on the first delay value associated with the small delay CDD scheme, and receiving a message via the broadcast channel based on performing the channel estimation.

A UE for wireless communication is described. The UE may include one or more memories storing processor executable code, and one or more processors coupled with the one or more memories. The one or more processors may individually or collectively operable to execute the code to cause the UE to obtain a first delay value associated with a small delay CDD scheme for a broadcast channel, perform channel estimation for the broadcast channel in accordance with one or more delay spread values associated with a multi-path profile of the broadcast channel, where the one or more delay spread values are based on the first delay value associated with the small delay CDD scheme, and receive a message via the broadcast channel based on performing the channel estimation.

Another UE for wireless communication is described. The UE may include means for obtaining a first delay value associated with a small delay CDD scheme for a broadcast channel, means for performing channel estimation for the broadcast channel in accordance with one or more delay spread values associated with a multi-path profile of the broadcast channel, where the one or more delay spread values are based on the first delay value associated with the small delay CDD scheme, and means for receiving a message via the broadcast channel based on performing the channel estimation.

A non-transitory computer-readable medium storing code for wireless communication is described. The code may include instructions executable by one or more processors to obtain a first delay value associated with a small delay CDD scheme for a broadcast channel, perform channel estimation for the broadcast channel in accordance with one or more delay spread values associated with a multi-path profile of the broadcast channel, where the one or more delay spread values are based on the first delay value associated with the small delay CDD scheme, and receive a message via the broadcast channel based on performing the channel estimation.

In some examples of the method, UEs, and non-transitory computer-readable medium described herein, obtaining the first delay value may include operations, features, means, or instructions for selecting the first delay value from a first set of candidate delay values associated with the broadcast channel.

Some examples of the method, UEs, and non-transitory computer-readable medium described herein may further include operations, features, means, or instructions for selecting the first set of candidate delay values from a set of multiple candidate delay values based on a frequency band associated with the broadcast channel.

In some examples of the method, UEs, and non-transitory computer-readable medium described herein, the first delay value may be in accordance with a basic time unit associated with the broadcast channel.

Some examples of the method, UEs, and non-transitory computer-readable medium described herein may further include operations, features, means, or instructions for calculating a delay spread limit value based on the first delay value, where the channel estimation may be performed in accordance with the delay spread limit value.

Some examples of the method, UEs, and non-transitory computer-readable medium described herein may further include operations, features, means, or instructions for determining a delay spread distribution associated with the multi-path profile based on the first delay value, where the channel estimation may be performed in accordance with the delay spread distribution.

Some examples of the method, UEs, and non-transitory computer-readable medium described herein may further include operations, features, means, or instructions for obtaining a second delay value associated with the small delay CDD scheme for a control resource set scheduled via the broadcast channel, performing channel estimation for the control resource set in accordance with the second delay value, and receiving a control message via the control resource set based on performing the channel estimation for the control resource set.

In some examples of the method, UEs, and non-transitory computer-readable medium described herein, obtaining the second delay value may include operations, features, means, or instructions for selecting the second delay value based on the first delay value such that the first delay value and the second delay value may be the same.

In some examples of the method, UEs, and non-transitory computer-readable medium described herein, receiving the message via the broadcast channel may include operations, features, means, or instructions for receiving the message indicating the second delay value, where determining the second delay value may be based on receiving the message.

In some examples of the method, UEs, and non-transitory computer-readable medium described herein, the control resource set includes a default control resource set and the control message schedules a system information block transmission.

In some examples of the method, UEs, and non-transitory computer-readable medium described herein, obtaining the first delay value may include operations, features, means, or instructions for receiving a control message scheduling the message via the broadcast channel, where the control message indicates the first delay value.

In some examples of the method, UEs, and non-transitory computer-readable medium described herein, the control message indicates a bit value and the first delay value may be selected from a set of candidate delay values associated with the broadcast channel based on the bit value.

Some examples of the method, UEs, and non-transitory computer-readable medium described herein may further include operations, features, means, or instructions for selecting the set of candidate delay values based on a frequency band associated with the broadcast channel.

A method for wireless communication by a UE is described. The method may include receiving a first control message indicating a set of multiple candidate delay values associated with a small delay CDD scheme for a channel, receiving a second control message indicating, for a scheduled message, a delay value of the set of multiple candidate delay values that is applied for the scheduled message, performing channel estimation for the channel in accordance with one or more delay spread values associated with a multi-path profile of the channel, where the one or more delay spread values are based on the delay value that is applied for the scheduled message, and receiving the scheduled message based on performing the channel estimation.

A UE for wireless communication is described. The UE may include one or more memories storing processor executable code, and one or more processors coupled with the one or more memories. The one or more processors may individually or collectively operable to execute the code to cause the UE to receive a first control message indicating a set of multiple candidate delay values associated with a small delay CDD scheme for a channel, receive a second control message indicating, for a scheduled message, a delay value of the set of multiple candidate delay values that is applied for the scheduled message, perform channel estimation for the channel in accordance with one or more delay spread values associated with a multi-path profile of the channel, where the one or more delay spread values are based on the delay value that is applied for the scheduled message, and receive the scheduled message based on performing the channel estimation.

Another UE for wireless communication is described. The UE may include means for receiving a first control message indicating a set of multiple candidate delay values associated with a small delay CDD scheme for a channel, means for receiving a second control message indicating, for a scheduled message, a delay value of the set of multiple candidate delay values that is applied for the scheduled message, means for performing channel estimation for the channel in accordance with one or more delay spread values associated with a multi-path profile of the channel, where the one or more delay spread values are based on the delay value that is applied for the scheduled message, and means for receiving the scheduled message based on performing the channel estimation.

A non-transitory computer-readable medium storing code for wireless communication is described. The code may include instructions executable by one or more processors to receive a first control message indicating a set of multiple candidate delay values associated with a small delay CDD scheme for a channel, receive a second control message indicating, for a scheduled message, a delay value of the set of multiple candidate delay values that is applied for the scheduled message, perform channel estimation for the channel in accordance with one or more delay spread values associated with a multi-path profile of the channel, where the one or more delay spread values are based on the delay value that is applied for the scheduled message, and receive the scheduled message based on performing the channel estimation.

In some examples of the method, UEs, and non-transitory computer-readable medium described herein, the first control message includes a radio resource control (RRC) message.

In some examples of the method, UEs, and non-transitory computer-readable medium described herein, the second control message includes a medium access control-control element (MAC-CE) message.

Some examples of the method, UEs, and non-transitory computer-readable medium described herein may further include operations, features, means, or instructions for receiving, prior to receiving the second control message, a third control message that indicates a set of active delay values from the set of multiple candidate delay values, the set of active delay values including the delay value, where the set of active delay values may be mapped to a codepoints of a downlink control information field of the second control message.

In some examples of the method, UEs, and non-transitory computer-readable medium described herein, receiving the second control message may include operations, features, means, or instructions for receiving the second control message including the downlink control information field, the downlink control information field indicating the delay value selected from the set of active delay values.

In some examples of the method, UEs, and non-transitory computer-readable medium described herein, the second control message includes a downlink control message and the third control message includes a MAC-CE message.

In some examples of the method, UEs, and non-transitory computer-readable medium described herein, the first control message, the second control message, or both, may be transmitted as part of a transmission configuration indicator (TCI) indication procedure.

A method for wireless communication by a network entity is described. The method may include obtaining a first delay value associated with a small delay CDD scheme for a broadcast channel, outputting an indication of the first delay value, where the first delay value is associated with channel estimation for the broadcast channel in accordance with one or more delay spread values associated with a multi-path profile of the broadcast channel, and where the one or more delay spread values are based on the first delay value associated with the small delay CDD scheme, and outputting a message via the broadcast channel based on outputting the indication of the first delay value.

A network entity for wireless communication is described. The network entity may include one or more memories storing processor executable code, and one or more processors coupled with the one or more memories. The one or more processors may individually or collectively operable to execute the code to cause the network entity to obtain a first delay value associated with a small delay CDD scheme for a broadcast channel, output an indication of the first delay value, where the first delay value is associated with channel estimation for the broadcast channel in accordance with one or more delay spread values associated with a multi-path profile of the broadcast channel, and where the one or more delay spread values are based on the first delay value associated with the small delay CDD scheme, and output a message via the broadcast channel based on outputting the indication of the first delay value.

Another network entity for wireless communication is described. The network entity may include means for obtaining a first delay value associated with a small delay CDD scheme for a broadcast channel, means for outputting an indication of the first delay value, where the first delay value is associated with channel estimation for the broadcast channel in accordance with one or more delay spread values associated with a multi-path profile of the broadcast channel, and where the one or more delay spread values are based on the first delay value associated with the small delay CDD scheme, and means for outputting a message via the broadcast channel based on outputting the indication of the first delay value.

A non-transitory computer-readable medium storing code for wireless communication is described. The code may include instructions executable by one or more processors to obtain a first delay value associated with a small delay CDD scheme for a broadcast channel, output an indication of the first delay value, where the first delay value is associated with channel estimation for the broadcast channel in accordance with one or more delay spread values associated with a multi-path profile of the broadcast channel, and where the one or more delay spread values are based on the first delay value associated with the small delay CDD scheme, and output a message via the broadcast channel based on outputting the indication of the first delay value.

In some examples of the method, network entities, and non-transitory computer-readable medium described herein, obtaining the first delay value may include operations, features, means, or instructions for selecting the first delay value from a first set of candidate delay values associated with the broadcast channel.

Some examples of the method, network entities, and non-transitory computer-readable medium described herein may further include operations, features, means, or instructions for selecting the first set of candidate delay values from a set of multiple candidate delay values based on a frequency band associated with the broadcast channel.

In some examples of the method, network entities, and non-transitory computer-readable medium described herein, the first delay value may be determined based on a basic time unit associated with the broadcast channel.

Some examples of the method, network entities, and non-transitory computer-readable medium described herein may further include operations, features, means, or instructions for obtaining a second delay value associated with the small delay CDD scheme for a control resource set scheduled via the broadcast channel, outputting an indication of the second delay value, where the second delay value may be associated with channel estimation for the control resource set, and obtaining a control message via the control resource set based on outputting the indication of the second delay value.

In some examples of the method, network entities, and non-transitory computer-readable medium described herein, obtaining the second delay value may include operations, features, means, or instructions for selecting the second delay value based on the first delay value such that the first delay value and the second delay value may be the same.

In some examples of the method, network entities, and non-transitory computer-readable medium described herein, outputting the message via the broadcast channel may include operations, features, means, or instructions for outputting the message indicating the second delay value, where outputting the indication of the second delay value includes outputting the message via the broadcast channel.

In some examples of the method, network entities, and non-transitory computer-readable medium described herein, the control resource set includes a default control resource set and the control message schedules a system information block transmission.

In some examples of the method, network entities, and non-transitory computer-readable medium described herein, outputting the indication of the first delay value may include operations, features, means, or instructions for outputting a control message scheduling the message via the broadcast channel, where the control message indicates the first delay value.

In some examples of the method, network entities, and non-transitory computer-readable medium described herein, the control message indicates a bit value and the first delay value may be selected from a set of candidate delay values associated with the broadcast channel based on the bit value.

Some examples of the method, network entities, and non-transitory computer-readable medium described herein may further include operations, features, means, or instructions for selecting the set of candidate delay values based on a frequency band associated with the broadcast channel.

A method for wireless communication by a network entity is described. The method may include outputting a first control message indicating a set of multiple candidate delay values associated with a small delay CDD scheme for a channel, outputting a second control message indicating, for a scheduled message, a delay value of the set of multiple candidate delay values that is applied for the scheduled message, and outputting the scheduled message based on outputting the second control message.

A network entity for wireless communication is described. The network entity may include one or more memories storing processor executable code, and one or more processors coupled with the one or more memories. The one or more processors may individually or collectively operable to execute the code to cause the network entity to output a first control message indicating a set of multiple candidate delay values associated with a small delay CDD scheme for a channel, output a second control message indicating, for a scheduled message, a delay value of the set of multiple candidate delay values that is applied for the scheduled message, and output the scheduled message based on outputting the second control message.

Another network entity for wireless communication is described. The network entity may include means for outputting a first control message indicating a set of multiple candidate delay values associated with a small delay CDD scheme for a channel, means for outputting a second control message indicating, for a scheduled message, a delay value of the set of multiple candidate delay values that is applied for the scheduled message, and means for outputting the scheduled message based on outputting the second control message.

A non-transitory computer-readable medium storing code for wireless communication is described. The code may include instructions executable by one or more processors to output a first control message indicating a set of multiple candidate delay values associated with a small delay CDD scheme for a channel, output a second control message indicating, for a scheduled message, a delay value of the set of multiple candidate delay values that is applied for the scheduled message, and output the scheduled message based on outputting the second control message.

In some examples of the method, network entities, and non-transitory computer-readable medium described herein, the first control message includes an RRC message.

In some examples of the method, network entities, and non-transitory computer-readable medium described herein, the second control message includes a MAC-CE message.

Some examples of the method, network entities, and non-transitory computer-readable medium described herein may further include operations, features, means, or instructions for outputting, prior to outputting the second control message, a third control message that indicates a set of active delay values from the set of multiple candidate delay values, the set of active delay values including the delay value, where the set of active delay values may be mapped to a codepoints of a downlink control information field of the second control message.

In some examples of the method, network entities, and non-transitory computer-readable medium described herein, outputting the second control message may include operations, features, means, or instructions for outputting the second control message including the downlink control information field, the downlink control information field indicating the delay value selected from the set of active delay values.

In some examples of the method, network entities, and non-transitory computer-readable medium described herein, the second control message includes a downlink control message and the third control message includes a MAC-CE message.

In some examples of the method, network entities, and non-transitory computer-readable medium described herein, the first control message, the second control message, or both, may be output as part of a TCI indication procedure.

DETAILED DESCRIPTION

In some systems, a UE may experience unreliable communications due to fading or interference (e.g., in high mobility scenarios). To improve signal quality and reliability, a wireless communications system may support a diversity scheme, in which a message may be transmitted via multiple signal paths to the UE. In some cases, such as in small delay CDD schemes, a multi-path profile of a channel may be associated with one or more delay spread values associated with repetition of a transmission. For the UE to successfully receive a message via the channel, the UE may perform channel estimation in accordance with the one or more delay spread values. However, the UE may not be aware of the delay spread values, which may depend on a channel profile, a modulation and coding scheme, or a resource allocation by the network entity. As such, techniques for the UE to determine the delay spread values for performing channel estimation may be desired.

In accordance with examples as described herein, a UE may determine a delay value for a small delay CDD scheme. The UE may determine one or more delay spread values associated with a multi-path profile of a channel based on the delay value, and the UE may then perform channel estimation in accordance with the one or more delay spread values. In some examples, such as for a PBCH, the UE may be configured with a delay value or a range of delay values that are based on a range of frequency bands, and the UE may select the delay value based on the frequency band associated with the PBCH. In some cases, a delay value for a downlink control channel (e.g., CORESET 0) scheduling an SIB (e.g., SIB1) may be the same as the delay value for the PBCH. Additionally, or alternatively, the UE may receive an indication of the delay value for the downlink control channel via the PBCH. In some examples, for a broadcast data channel (e.g., an SIB), a corresponding delay value may be indicated by a downlink control channel that schedules the broadcast data channel, and the delay value may be selected from set of frequency-band specific delay values. In some examples, such as for a CSS, a USS, or for unicast data channels, the UE may receive a first control message indicating a set of candidate delay values, and a second control message indicating an active delay value for performing channel estimation. As such, the UE may obtain delay values corresponding to different channel types, and the UE may perform channel estimation accordingly to successfully receive a message.

Aspects of the disclosure are initially described in the context of wireless communications systems. Aspects of the disclosure are further illustrated with reference to process flows. Aspects of the disclosure are further illustrated by and described with reference to apparatus diagrams, system diagrams, and flowcharts that relate to small delay CDD for data or control channels.

Figure 1:
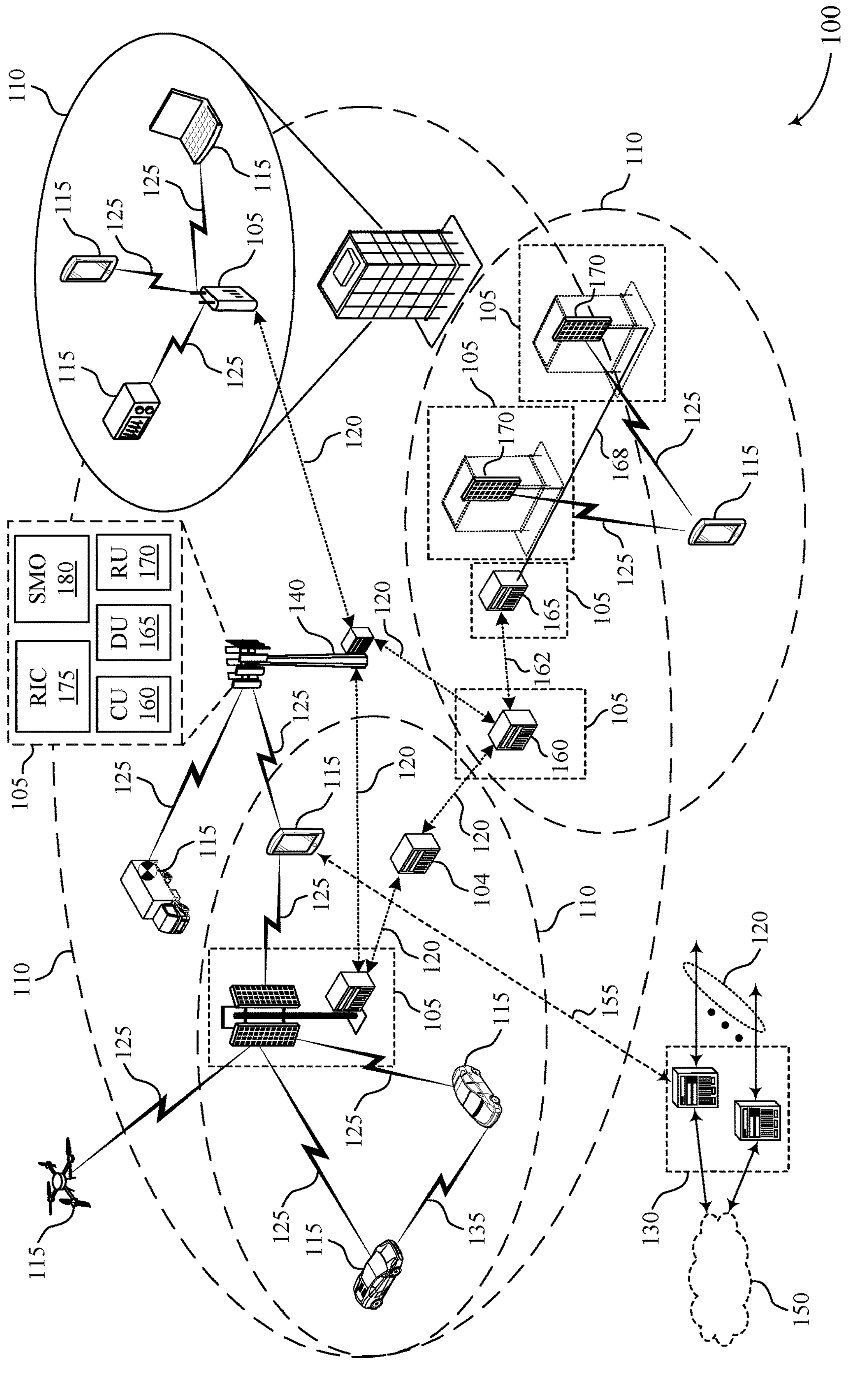
FIG. 1 shows an example of a wireless communications system that supports small delay CDD for data or control channels in accordance with one or more aspects of the present disclosure.

FIG. 1 shows an example of a wireless communications system 100 that supports small delay CDD for data or control channels in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support small delay CDD for data or control channels as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $$T_C = 1/(\Delta f_{max} \cdot N_f)$$

seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, a UE 115 may receive messages via one or more channels from a network entity 105 based on a diversity scheme. The diversity scheme may improve communication reliability, for example, for broadcast channels, by implementing signal diversity in time, frequency, space, polarization, or a combination thereof, for a transmitted message. This may improve reliability relative to transmitting via a single channel at a single time occasion, as the channel may experience fading or interference. In some cases, the diversity scheme may be used prior to establishing an RRC connection between the UE 115 and the network entity 105, or as a fallback in case of unreliable feedback (e.g., channel state information (CSI) feedback), such as in high mobility scenarios. A diversity scheme may support increased performance while incurring relatively low overhead (e.g., demodulation reference signal (DMRS) overhead).

In some cases, the UE 115 may utilize a transparent diversity scheme (e.g., involving physical resource block group (PRG)-level precoder cycling, transparent small delay CDD, or both). However, a transparent diversity scheme may not achieve as high of a level of diversity, which may reduce a network coverage relative to non-transparent diversity schemes, such as space frequency block coding (SFBC) or long delay CDD). An SFBC scheme may support full-rate and full-diversity when operating using two-port MIMO, and a long delay CDD may support a coded diversity scheme which may benefit from frequency selectivity (e.g., two or four port, up to rank four). In some examples, in a massive MIMO setup, two ports for these schemes may be selected from two different antenna polarizations or sub-arrays.

In some examples, however, SFBC and long delay CDD schemes may not be supported in some channels (e.g., data channels). For example, as these schemes may use at least two antenna ports to transmit a single layer, and some channels (e.g., NR channels) may use multi-layer spatial modulation (SM) transmissions, the quantity of antenna ports may be very large. Additionally, or alternatively, having multiple transmission schemes and an inconsistency between a signal transmitted via a channel and a DMRS transmission may lead to a complex implementation at a UE 115 and may limit the application of interference-aware advance receivers. As such, it may be beneficial to establish a non-transparent diversity scheme, such as non-transparent small delay CDD scheme. The small delay CDD scheme may rely on shorter delays relative to the long delay CDD. In some cases, the delays associated with a small delay CDD scheme may be shorter than a cyclic prefix length, while the delays associated with a long delay CDD may be larger than the cyclic prefix length.

In some examples, to implement a CDD scheme, a UE 115 may determine a delay limit (e.g., a maximum delay) after applying the CDD scheme based on a limit delay CDD value (e.g., a maximum CDD value). For example, the delay limit after applying the CDD scheme may be given by Equation 1 below:

$$\text{Limit delay} = [(\delta_{max}^{cyc} + N_{max}) \bmod N_{FFT}] \times \tau_s \quad (1)$$

where $$\delta_{max}^{cyc}$$

represents a limit (e.g., maximum, highest) CDD value associated with the CDD scheme, $N_{max}$ is the limit (e.g., maximum) channel delay in terms of samples, $N_{FFT}$ is the quantity of data symbols associated with the channel, and is $\tau_s$ a sampling rate. The UE 115 may calculate an effective channel (e.g., H(l)), based on the CDD values. A precoding vector may be calculated based on the effective channel, and in some examples, the precoding vector for the CDD scheme may be equivalent to a resource element-level precoder cycling.

In some examples, CDD values (e.g., optimal CDD values) may be dependent on a channel profile (e.g., a multi-path channel profile), a modulation and coding scheme associated with the channel (e.g., which may be based on a signal-to-noise ratio (SNR)), and a resource allocation for the channel. In some cases, if a CDD value is not known to a UE 115, the performance of the CDD scheme may be sensitive to a chosen delay value. As such, the CDD value may be restricted to a small range of values, which may limit the gain in diversity.

In a transparent CDD scheme, a UE 115 may derive a power delay profile (PDP) window based on a received TRS, which does not apply CDD. As such, the UE 115 may determine the PDP window for receiving a message. In some cases, the UE 115 may underestimate the PDP window size, for example, in case of a small delay CDD transmission. In some examples, a scheme (e.g., scheme 1) may be supported which may include multiple tracking reference signal (TRS) resources specific to the scheme. In some cases, such as for scheme 1, the channel experienced by TRS may already include additional delay added by the CDD, but this may increase a TRS resource overhead, which may increase a complexity of a scheduler at a network entity 105. Accordingly, techniques for a UE 115 to determine a CDD delay value for different transmission types may be desired.

In accordance with examples as described herein, a UE 115 may determine a delay value for a small delay CDD scheme (e.g., a non-transparent small delay CDD scheme). The UE 115 may determine one or more delay spread values associated with a multi-path profile of a channel based on the delay value, and the UE 115 may then perform channel estimation in accordance with the one or more delay spread values. In some examples, such as for a PBCH, the UE 115 may be configured with a delay value or a range of delay values that are based on a range of frequency bands, and the UE 115 may select the delay value based on the frequency band associated with the PBCH. In some cases, a delay value for a downlink control channel (e.g., CORESET 0) scheduling an SIB (e.g., SIB1) may be determined based on the CDD value for the PBCH. In some examples, such as for a CSS, a USS, or for unicast data channels, the UE 115 may receive a first control message indicating a set of candidate delay values, and a second control message indicating an active delay value for performing channel estimation. As such, the UE 115 may obtain delay values corresponding to different channel types, and the UE 115 may perform channel estimation accordingly to successfully receive a message.

Figure 2:
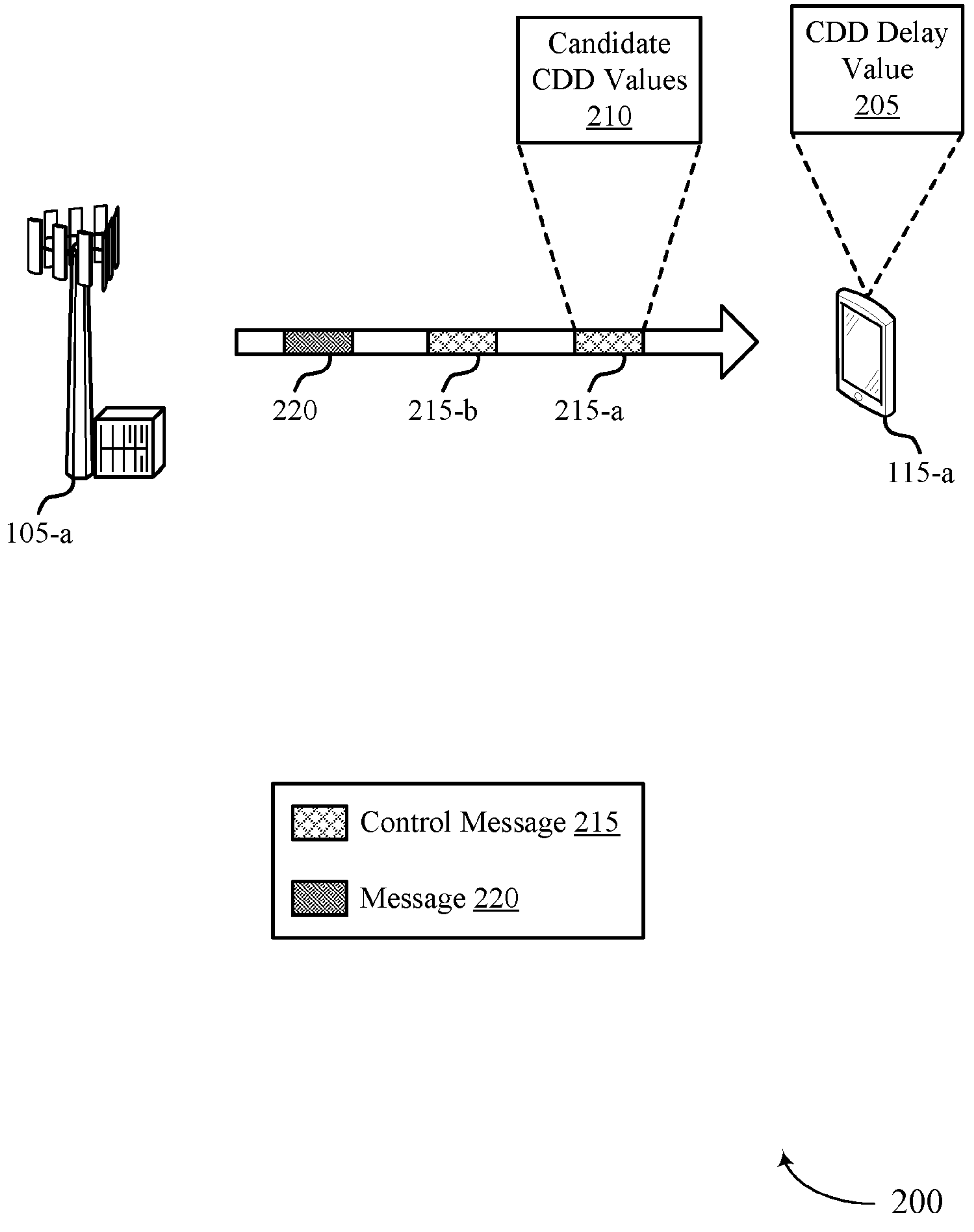
FIG. 2 shows an example of a wireless communications system that supports small delay CDD for data or control channels in accordance with one or more aspects of the present disclosure.

FIG. 2 shows an example of a wireless communications system 200 that supports small delay CDD for data or control channels in accordance with one or more aspects of the present disclosure. The wireless communications system 200 illustrates communications between a network entity 105-*a* and a UE 115-*a*, which may be examples of corresponding devices as described with reference to FIG. 1.

In some examples, as described herein, the network entity 105-*a* and the UE 115-*a* may communicate in accordance with a small delay CDD scheme (e.g., a non-transparent small delay CDD). The UE 115-*a* may determine a CDD delay value 205 associated with the small delay CDD scheme, and the UE 115-*a* may perform channel estimation for a channel based on the CDD delay value 205. The network entity 105-*a* may select CDD delay values 205 for different channels for communication with the UE 115-*a*, and the UE 115-*a* may perform channel estimation for each channel according to the corresponding CDD delay value 205.

In some examples, to perform the channel estimation, the UE 115-*a* may determine a delay spread limit value (e.g., a maximum delay spread value) using the CDD delay value 205. Additionally, or alternatively, the UE 115-*a* may calculate a delay spread distribution (e.g., a delay profile including one or more delay values) associated with the channel based on the CDD delay value 205, and the UE 115-*a* may perform channel estimation based on the delay spread limit value, the delay spread distribution, or both. Accordingly, the UE 115-*a* may receive a message 220 via a respective channel based on performing the channel estimation for the channel.

In some cases, the CDD delay value 205 may be dependent on a channel profile, an SNR, a bandwidth associated with a channel, or a combination thereof. For example, the UE 115-*a* may be configured with a set of one or more candidate CDD values 210 (e.g., candidate CDD delay values), and the UE 115-*a* may select the CDD delay value 205 from the candidate CDD values 210 based on the channel profile, SNR, the bandwidth, or other parameters. In some cases, the candidate CDD values 210 may be indicated by the network entity 105-*a* via a control message 215-*a* (e.g., an RRC message). In some cases, the network entity 105-*a* may transmit a control message 215-*b* to indicate a CDD delay value 205 from the candidate CDD values 210. In some examples, The UE 115-*a* may determine CDD delay values 205 for multiple different channels, as described herein, and the UE 115-*a* may perform channel estimation accordingly for each channel.

In some examples, such as for performing channel estimation for a PBCH, the UE 115-*a* may select the CDD delay value 205 from a range of CDD delay values. In some cases, the UE 115-*a* may be configured with multiple ranges of CDD delay values, and the UE 115-*a* may select a range based on a frequency band associated with the PBCH. In some examples, lower frequency ranges may be associated with higher delay values, and vice versa. As a non-limiting example, the UE 115-*a* may be configured with the following CDD value ranges that vary by frequency band:

$512T_c - 768T_c$ for a frequency band < 6 GHz;

$256T_c - 512T_c$ for a frequency band between 6 GHz and 15 GHz; and $512T_c - 768T_c$ for a frequency band > 15 GHz.

In these ranges, $T_c$ may represent a basic time unit (e.g., a tick size) associated with the PBCH, and may be given by Equation 2 below:

$$T_c = \frac{1}{\Delta f_{max} N_f} \qquad (2)$$

where $\Delta f_{max}$ is a limit (e.g., maximum) subcarrier spacing (e.g., 480 kilohertz, in some systems) and $N_f$ is a limit (e.g., maximum) fast Fourier transform size (e.g., 4096, in some systems). As such, the UE 115-*a* may select a CDD delay value 205 from a range of CDD values based on the frequency band associated with the PBCH and perform channel estimation on the PBCH to receive a message 220 via the PBCH.

In some examples, such as for receiving a control resource set (e.g., a default control set, such as CORESET 0), the UE 115-*a* may determine a CDD delay value 205 based on the PBCH. For example, the UE 115-*a* may apply the same CDD delay value 205 determined for the PBCH to the channel estimation for the control resource set. Additionally, or alternatively, the network entity 105-*a* may indicate a CDD delay value 205 corresponding to channel estimation for the control resource set via the PBCH, such as via a master information block (MIB) transmitted via the PBCH. As such, the UE 115-*a* may perform channel estimation and receive the control resource set. In some cases, the control resource set (e.g., the CORESET 0) may include a downlink control channel message (e.g., a control message 215) that schedules an SIB transmission (e.g., SIB1).

In some examples, such as for performing channel estimation for a broadcast downlink shared channel (e.g., a physical downlink shared channel (PDSCH)), such as an SIB, the UE 115-*a* may obtain a CDD delay value 205 to use via a downlink control message (e.g., a physical downlink control channel (PDCCH) message, a control message 215) that schedules the broadcast downlink shared channel. For example, the UE 115-*a* may receive the downlink control message via the control resource set (e.g., CORESET) that schedules the SIB, and the downlink control message may include an indication of a CDD delay value 205 for the SIB. In some examples, the UE 115-*a* may be configured with a set of candidate CDD values 210, and the downlink control message that schedules the broadcast downlink shared channel may include one or more bits that indicate a CDD delay value 205 from the set of candidate CDD values 210. For instance, the UE 115-*a* may be configured with a set of candidate CDD values 210 that varies based on a frequency band associated with the broadcast downlink shared channel. Table 1 illustrates an example of these candidate CDD values 210, where Fe represents a frequency band associated with the downlink control message (e.g., or the broadcast downlink shared channel), though values other than those shown are possible.

TABLE 1

| Candidate CDD values 210 for broadcast downlink shared channel | | | |
|---|---|---|---|
| Bit Value | $F_c \le 6$ GHz | 6 GHz < $F_c$ < 15 GHz | $F_c \ge 15$ GHz |
| 00 | No CDD applied | No CDD applied | No CDD applied |
| 01 | $512T_c$ | $256T_c$ | $128T_c$ |
| 10 | $640T_c$ | $384T_c$ | $256T_c$ |
| 11 | $768T_c$ | $512T_c$ | $384T_c$ |

Accordingly, the downlink control message scheduling the downlink broadcast shared channel message may indicate a bit value corresponding to one of the candidate CDD values 210, and the UE 115-*a* may determine the CDD delay value 205 based on a frequency band associated with the broadcast downlink shared channel (e.g., a frequency band in which the UE 115-*a* is operating for monitoring of the broadcast downlink shared channel). As such, the UE 115-*a* may perform channel estimation for the downlink broadcast shared channel and receive a corresponding message. In some cases, one or more bit values may indicate the UE 115-*a* that no CDD was applied to a transmission. As such, the UE 115-*a* may perform channel estimation without accounting for CDD.

In some examples, the network entity 105-*a* may indicate or configure the UE 115-*a* with a CDD delay value 205 for a CSS or for a USS. The network entity 105-*a* may transmit a control message 215-*a* that configures the UE 115-*a* with candidate CDD values 210 for a CSS or a USS transmission. In some examples, the control message 215-*a* may be an RRC message. The network entity 105-*a* may then transmit a control message 215-*b* that indicates a CDD delay value 205 from the candidate CDD values 210 for the CSS or USS transmission. In some examples, the control message 215-*b* may be a MAC-CE message.

In some cases, if the UE 115-*a* does not receive a configuration of candidate CDD values 210, the UE 115-*a* may determine (e.g., assume) that CDD is not to be performed on the CSS or USS transmission. In some examples, the control message 215-*a*, the control message 215-*b*, or both, may be associated with a TCI indication (e.g., a TCI state indication). For example, the control message 215-*a*, the control message 215-*b*, or both, may be transmitted as part of a TCI indication procedure. Additionally, or alternatively, the indication of the candidate CDD values 210, the CDD delay value 205, or both, may be transmitted as part of the TCI indication procedure.

In some examples, the network entity 105-*a* may indicate or configure the UE 115-*a* with a CDD delay value 205 for a unicast downlink shared message (e.g., a unicast physical downlink shared channel (PDSCH) message). In some cases, the network entity 105-*a* may transmit a control message 215-*a* that configures the UE 115-*a* with candidate CDD values 210 for the unicast downlink shared message. In some examples, the control message 215-*a* may be an RRC message. The network entity 105-*a* may then transmit a control message 215-*b* that indicates a subset of CDD values from the candidate CDD values 210 that may be mapped to codepoints of a downlink control information (DCI) field in a third downlink control message 215 (e.g., a PDCCH message). In some examples, the control message 215-*b* may be a medium access control-control element (MAC-CE) message. The network entity 105-*a* may then transmit the third downlink control message 215, which may schedule the unicast downlink shared message, and the third downlink control message 215 may include the DCI field that indicates a CDD delay value 205 from the subset of CDD values of the candidate CDD values 210.

In some cases, one codepoint of the DCI field may be assigned as a default codepoint for a fallback transmission. For example, if a downlink shared message is transmitted without a DCI indication, the UE 115-*a* may use a CDD delay value 205 corresponding to the default codepoint to perform channel estimation for receiving the downlink shared message. Additionally, or alternatively, if the third control message 215 does not include an indication of a CDD delay value 205, the UE 115-*a* may use the CDD delay value 205 corresponding to the default codepoint. In some examples, the control message 215-*a* (e.g., the RRC message), the control message 215-*b* (e.g., the MAC-CE message), the third control message 215 (e.g., the PDCCH message), the indication of the CDD delay value 205, or any combination thereof, may be associated with a TCI indication for the UE 115-*a*. For example, any of the control messages 215 may be transmitted as part of a TCI indication procedure, or the indication of the CDD delay value 205 may be included within a TCI indication.

Accordingly, the UE 115-*a* may determine a CDD delay value 205 to use for performing channel estimation for multiple different message types, such as PBCH transmissions, control resource set transmissions, broadcast PDSCH transmissions, CSS and USS transmissions, and unicast PDSCH transmissions. As such, the network entity 105-*a* may transmit messages 220 with increased diversity, which may improve communication reliability with the UE 115-*a*.

Figure 3:
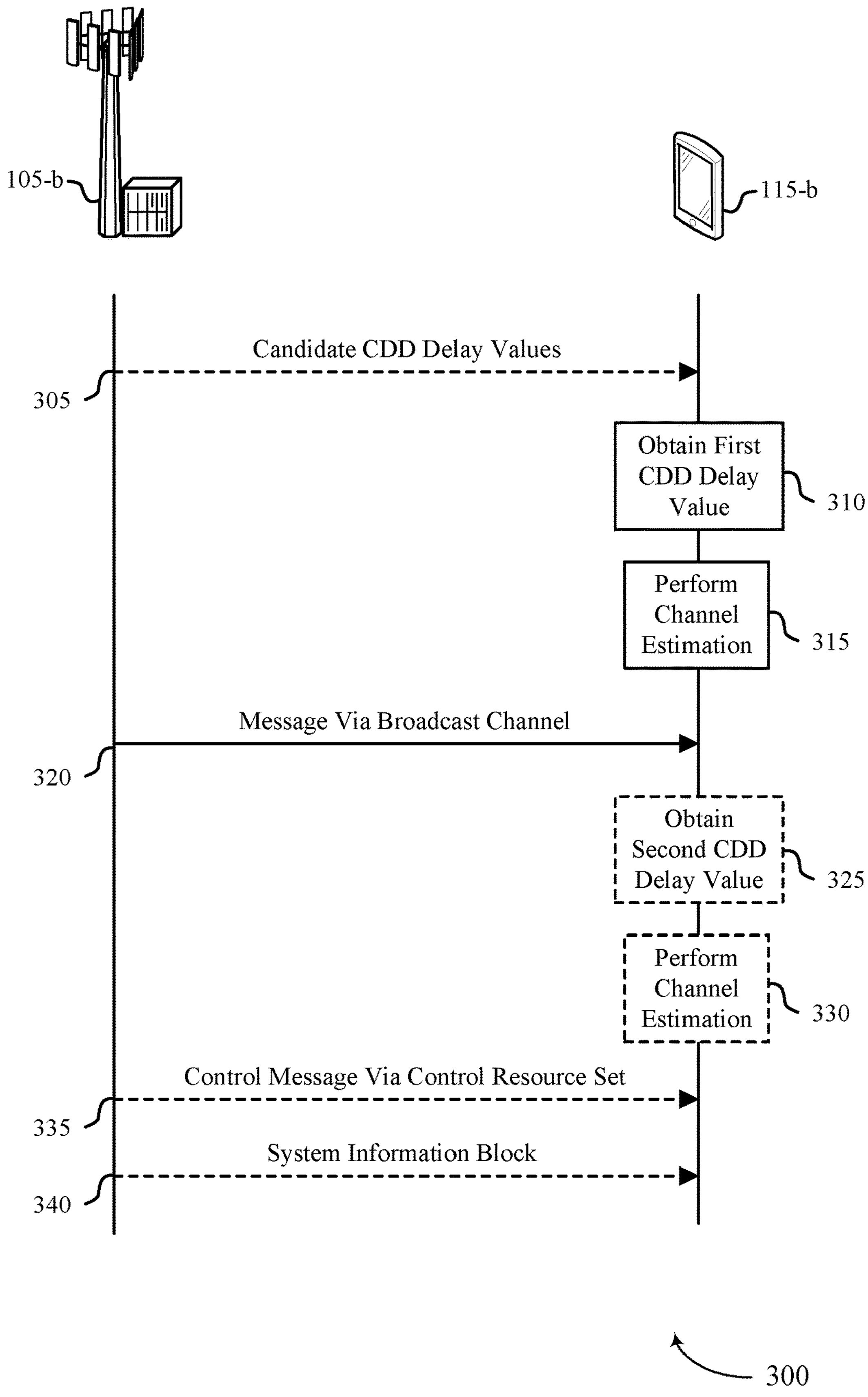
FIG. 3 shows an example of a process flow that supports small delay CDD for data or control channels in accordance with one or more aspects of the present disclosure.

FIG. 3 shows an example of a process flow 300 that supports small delay CDD for data or control channels in accordance with one or more aspects of the present disclosure. The process flow 300 illustrates communications between a network entity 105-*b* and a UE 115-*b*, which may be examples of corresponding devices as described herein, with reference to FIGS. 1 and 2. In some examples, some steps shown in the process flow 300 may be omitted or performed in a different order. Additionally, or alternatively, some steps may be added to the process flow 300.

At 305, the network entity 105-*b* may transmit a message that indicates a set of candidate CDD delay values to the UE 115-*b*. Additionally, or alternatively, the UE 115-*b* may be configured (e.g., previously configured, pre-configured) with the set of candidate CDD delay values without receiving an explicit indication from the network entity 105-*b*. The candidate CDD delay values may be associated with a small delay CDD scheme for a broadcast channel (e.g., a PBCH) to be used for communications between the network entity 105-*b* and the UE 115-*b*.

At 310, the UE 115-*b* may obtain a first CDD delay value associated with the small delay CDD scheme for the broadcast channel. In some examples, the first CDD delay value may be selected from the set of candidate CDD delay values associated with the broadcast channel. In some cases, the first CDD delay value may be selected based on a frequency band associated with the broadcast channel. For example, the UE 115-*b* may be configured with a multiple candidate CDD values, and the UE 115-*b* may select a subset of the candidate CDD values based on the frequency band associated with the broadcast channel. The UE 115-*b* may then select the first CDD delay value from the subset of the candidate CDD values. In some cases, the first CDD delay value may be determined by the UE 115-*b* based on a basic time unit (e.g., $T_c$) associated with the broadcast channel.

At 315, the UE 115-*b* may perform channel estimation for the broadcast channel in accordance with one or more delay spread values associated with a multi-path profile of the broadcast channel. The UE 115-*b* may determine the one or more delay spread values based on the first CDD delay value. In some examples, determining the one or more delay spread values may include calculating a delay spread limit value (e.g., a maximum delay spread value) based on the first CDD value, as described with reference to FIG. 2. Additionally, or alternatively, determining the one or more delay spread values may include determining a delay spread distribution (e.g., a delay profile) associated with the multi-path profile based on the first CDD value.

At 320, the network entity 105-*b* may transmit a message via the broadcast channel. The UE 115-*b* may receive the message via the broadcast channel based on performing channel estimation for the broadcast channel.

At 325, The UE 115-*b* may obtain a second CDD delay value associated with the small delay CDD scheme for a control resource set (e.g., a CORESET, such as CORESET 0 or a default control resource set) that may be scheduled via the broadcast channel (e.g., via an MIB transmitted via the broadcast channel). In some examples, the UE 115-*b* may select the second CDD delay value such that the second CDD delay value is the same as the first CDD delay value. Additionally, or alternatively, the message received via the broadcast channel (e.g., or another message) may indicate the second CDD delay value.

At 330, the UE 115-*b* may perform channel estimation for the control resource set in accordance with the second CDD delay value. For example, the UE 115-*b* may determine one or more delay spread values based on the second CDD delay value. In some examples, determining the one or more delay spread values may include calculating a delay spread limit value (e.g., a maximum delay spread value) based on the second CDD delay value or a delay spread distribution (e.g., a delay profile) associated with a multi-path profile of the control resource set based on the second CDD delay value.

At 335, the UE 115-*b* may receive a control message (e.g., a PDCCH) from the network entity 105-*b* via the control resource set based on performing the channel estimation for the control resource set. In some examples, the control message may schedule an SIB (e.g., a broadcast PDSCH, such as SIB1). In some cases, the control message may additionally indicate a third CDD delay value associated with the small delay CDD scheme for the SIB. In some examples, the control message may include a bit value that indicates the third CDD delay value from a set of candidate CDD delay values associated with the SIB. In some cases, the UE 115-*b* may select the third CDD delay value based on the bit value and a frequency band associated with the SIB. The UE 115-*b* may perform channel estimation for the SIB based on the third CDD delay value.

At 340, the UE 115-*b* may receive the SIB based on performing the channel estimation for the SIB (e.g., for the broadcast PDSCH).

Figure 4:
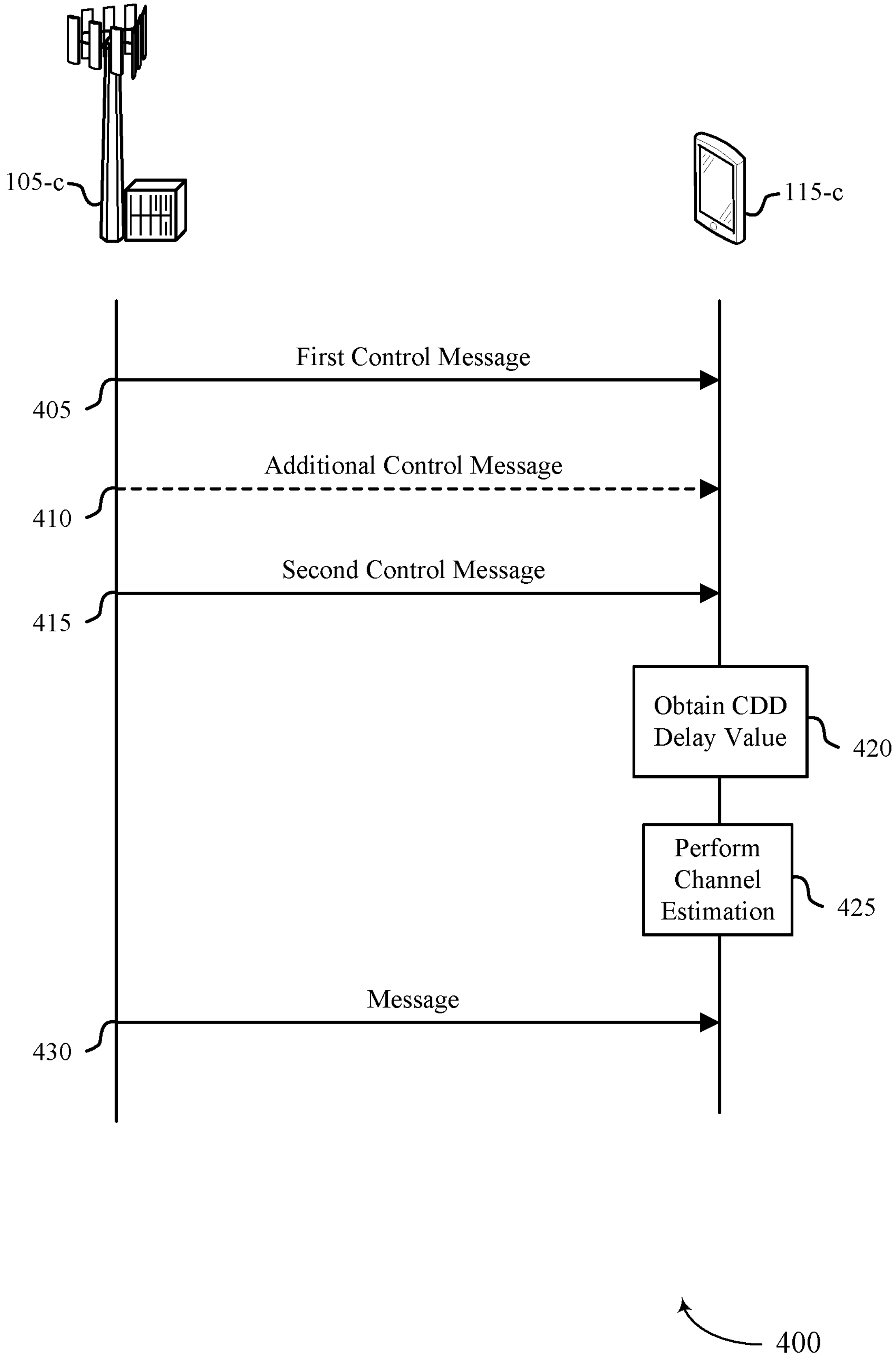
FIG. 4 shows an example of a process flow that supports small delay CDD for data or control channels in accordance with one or more aspects of the present disclosure.

FIG. 4 shows an example of a process flow 400 that supports small delay CDD for data or control channels in accordance with one or more aspects of the present disclosure. The process flow 300 illustrates communications between a network entity 105-*c* and a UE 115-*c*, which may be examples of corresponding devices as described herein, with reference to FIGS. 1 through 3. In some examples, some steps shown in the process flow 400 may be omitted or performed in a different order. Additionally, or alternatively, some steps may be added to the process flow 400.

At 405, the network entity 105-*c* may transmit a first control message to the UE 115-*c* that may indicate a set of candidate CDD delay values associated with a small delay CDD scheme for a channel (e.g., a CSS, a USS, a unicast PDSCH). In some examples, the first control message may be an example of an RRC message.

At 410, the network entity 105-*c* may transmit an additional control message to the UE 115-*c* that may indicate a set of active delay values from the set of candidate CDD delay values. In some examples, the additional control message may indicate a mapping of the set of active delay values to codepoints of a DCI field of a second control message that may schedule a message via the channel. In some cases, the second control message may be a MAC-CE message.

At 415, the network entity 105-*c* may transmit a second control message that may indicate, for a scheduled message, a CDD delay value of the set of candidate CDD delay values that is applied for the scheduled message. In some examples, the second control message may be a MAC-CE message. In some cases, if the network entity 105-*c* transmitted the additional control message, the second control message may include the DCI field that indicates the CDD delay value from the set of active delay values. In these cases, the second control message may be a PDCCH that may schedule the message.

At 420, the UE 115-*c* may obtain the CDD delay value based on receiving the second control message. At 425, the UE 115-*c* may perform channel estimation for the channel based on the CDD delay value. For example, the UE 115-*c* may perform channel estimation in accordance with a delay spread limit value (e.g., a maximum delay spread value) that is based on the CDD delay value or a delay spread distribution (e.g., a delay profile) associated with a multi-path profile of the channel based on the CDD delay value.

At 430, the UE 115-*c* may receive the scheduled message via the channel based on performing the channel estimation for the channel.

Figure 5:
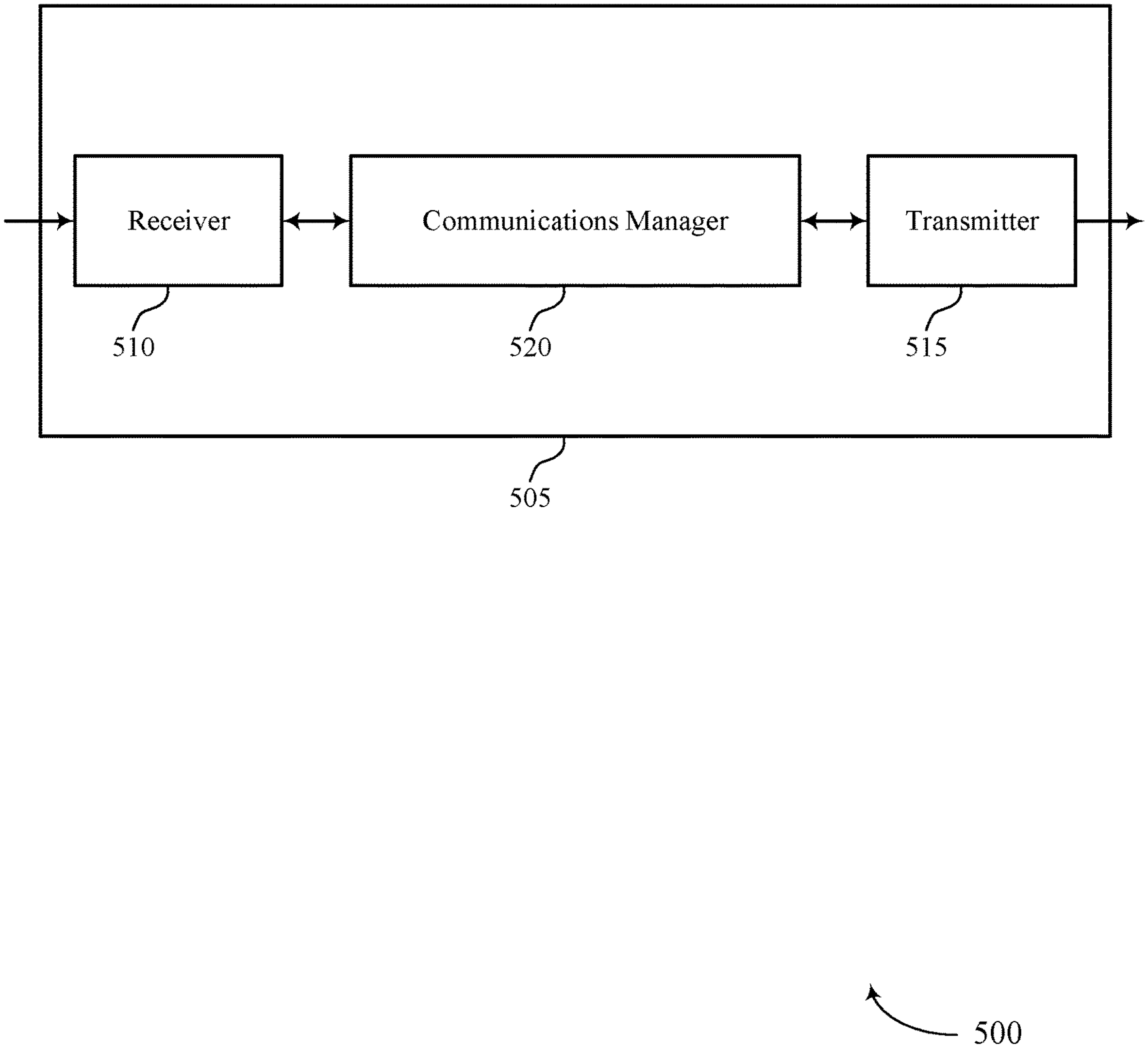
FIGS. 5 and 6 show block diagrams of devices that support small delay CDD for data or control channels in accordance with one or more aspects of the present disclosure.

FIG. 5 shows a block diagram 500 of a device 505 that supports small delay CDD for data or control channels in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to small delay CDD for data or control channels). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to small delay CDD for data or control channels). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of small delay CDD for data or control channels as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication in accordance with examples as disclosed herein. For example, the communications manager 520 is capable of, configured to, or operable to support a means for obtaining a first delay value associated with a small delay CDD scheme for a broadcast channel. The communications manager 520 is capable of, configured to, or operable to support a means for performing channel estimation for the broadcast channel in accordance with one or more delay spread values associated with a multi-path profile of the broadcast channel, where the one or more delay spread values are based on the first delay value associated with the small delay CDD scheme. The communications manager 520 is capable of, configured to, or operable to support a means for receiving a message via the broadcast channel based on performing the channel estimation.

Additionally, or alternatively, the communications manager 520 may support wireless communication in accordance with examples as disclosed herein. For example, the communications manager 520 is capable of, configured to, or operable to support a means for receiving a first control message indicating a set of multiple candidate delay values associated with a small delay CDD scheme for a channel. The communications manager 520 is capable of, configured to, or operable to support a means for receiving a second control message indicating, for a scheduled message, a delay value of the set of multiple candidate delay values that is applied for the scheduled message. The communications manager 520 is capable of, configured to, or operable to support a means for performing channel estimation for the channel in accordance with one or more delay spread values associated with a multi-path profile of the channel, where the one or more delay spread values are based on the delay value that is applied for the scheduled message. The communications manager 520 is capable of, configured to, or operable to support a means for receiving the scheduled message based on performing the channel estimation.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for a small delay CDD scheme for one or more channel types, which may increase diversity of a channel, thereby improving channel performance, reducing overhead (e.g., DMRS overhead), and improving communication stability between devices.

Figure 6:
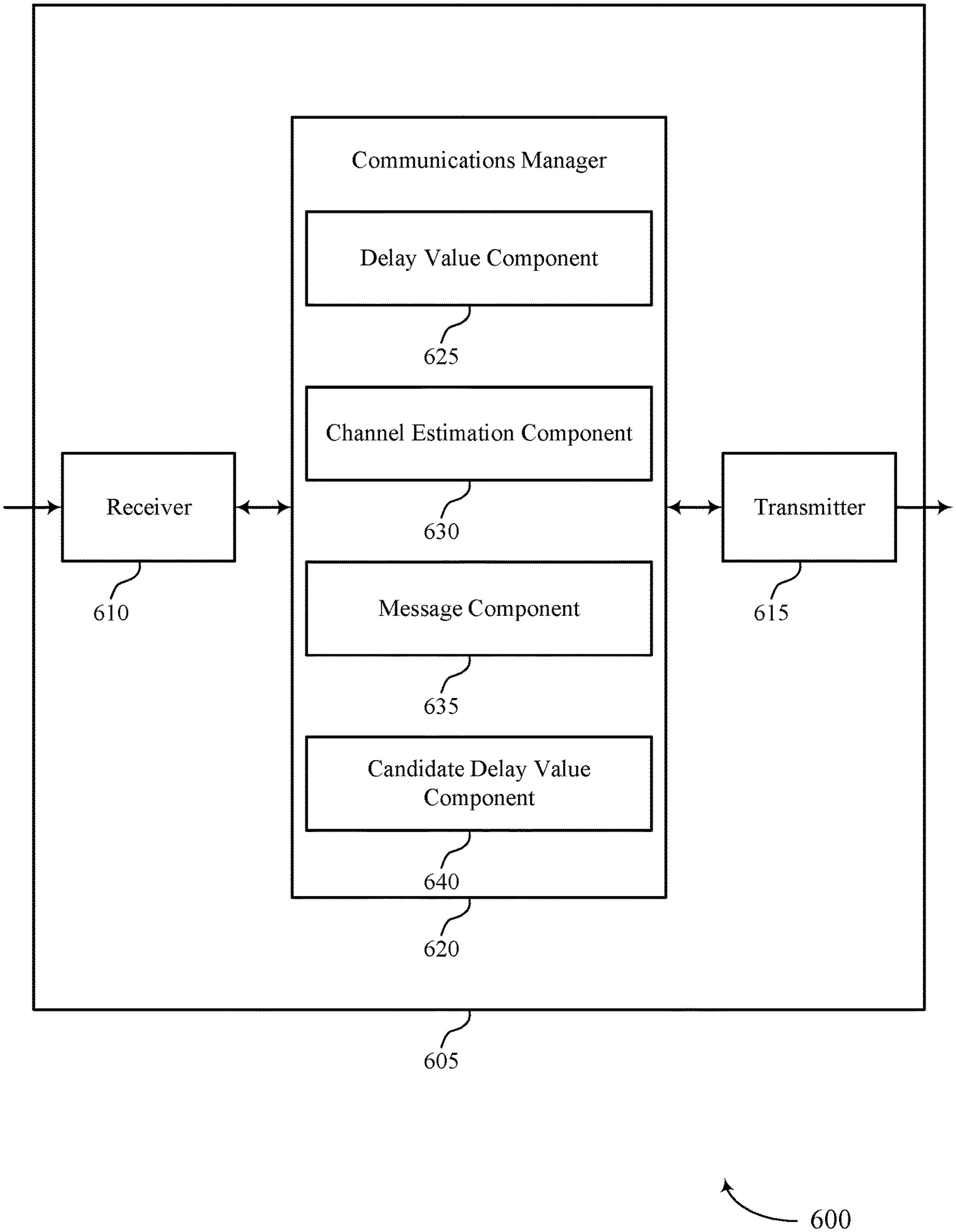

FIG. 6 shows a block diagram 600 of a device 605 that supports small delay CDD for data or control channels in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to small delay CDD for data or control channels). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to small delay CDD for data or control channels). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of small delay CDD for data or control channels as described herein. For example, the communications manager 620 may include a delay value component 625, a channel estimation component 630, a message component 635, a candidate delay value component 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication in accordance with examples as disclosed herein. The delay value component 625 is capable of, configured to, or operable to support a means for obtaining a first delay value associated with a small delay CDD scheme for a broadcast channel. The channel estimation component 630 is capable of, configured to, or operable to support a means for performing channel estimation for the broadcast channel in accordance with one or more delay spread values associated with a multi-path profile of the broadcast channel, where the one or more delay spread values are based on the first delay value associated with the small delay CDD scheme. The message component 635 is capable of, configured to, or operable to support a means for receiving a message via the broadcast channel based on performing the channel estimation.

Additionally, or alternatively, the communications manager 620 may support wireless communication in accordance with examples as disclosed herein. The candidate delay value component 640 is capable of, configured to, or operable to support a means for receiving a first control message indicating a set of multiple candidate delay values associated with a small delay CDD scheme for a channel. The delay value component 625 is capable of, configured to, or operable to support a means for receiving a second control message indicating, for a scheduled message, a delay value of the set of multiple candidate delay values that is applied for the scheduled message. The channel estimation component 630 is capable of, configured to, or operable to support a means for performing channel estimation for the channel in accordance with one or more delay spread values associated with a multi-path profile of the channel, where the one or more delay spread values are based on the delay value that is applied for the scheduled message. The message component 635 is capable of, configured to, or operable to support a means for receiving the scheduled message based on performing the channel estimation.

Figure 7:
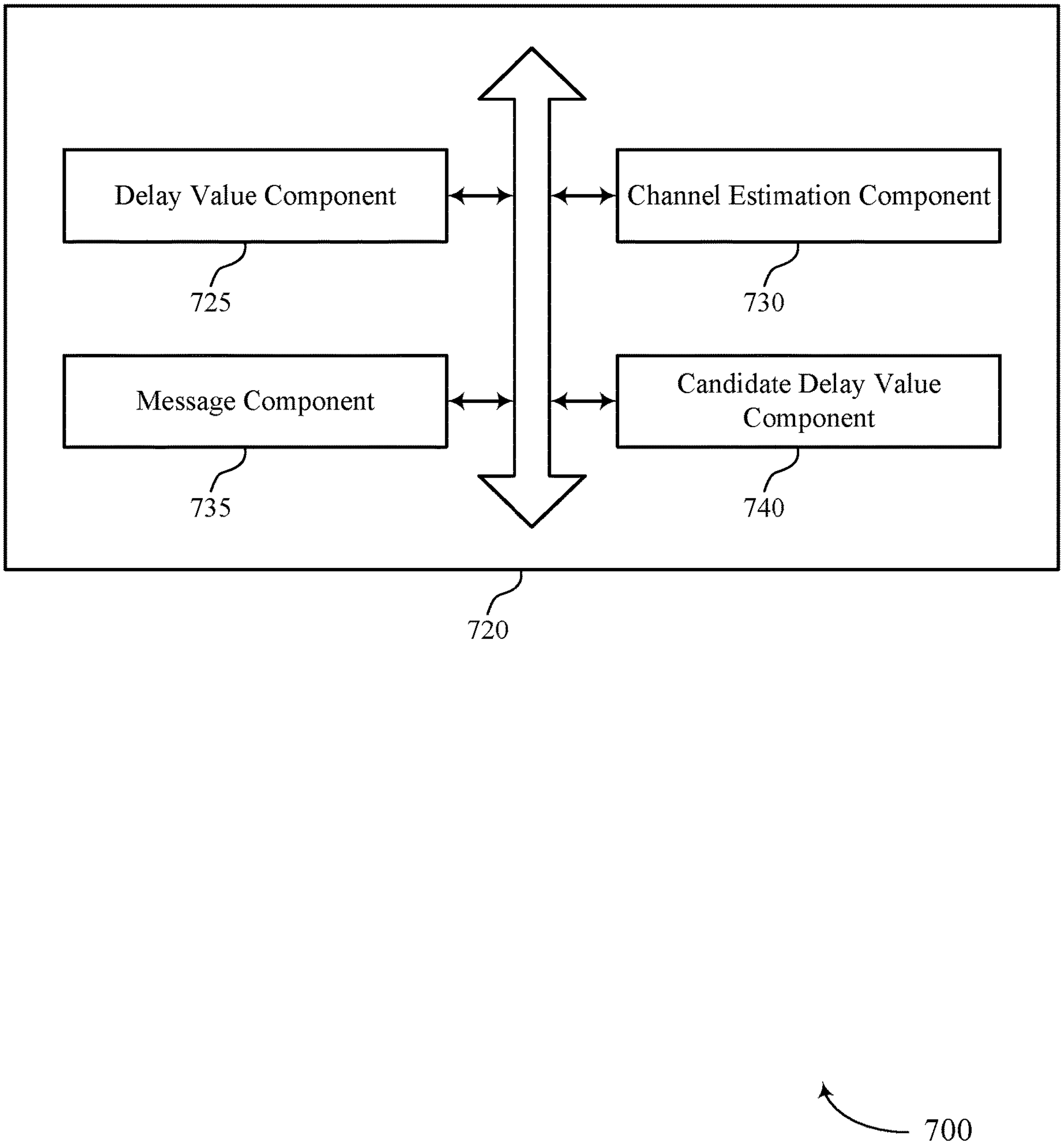
FIG. 7 shows a block diagram of a communications manager that supports small delay CDD for data or control channels in accordance with one or more aspects of the present disclosure.

FIG. 7 shows a block diagram 700 of a communications manager 720 that supports small delay CDD for data or control channels in accordance with one or more aspects of the present disclosure. The communications manager 720 may be an example of aspects of a communications manager 520, a communications manager 620, or both, as described herein. The communications manager 720, or various components thereof, may be an example of means for performing various aspects of small delay CDD for data or control channels as described herein. For example, the communications manager 720 may include a delay value component 725, a channel estimation component 730, a message component 735, a candidate delay value component 740, or any combination thereof. Each of these components, or components or subcomponents thereof (e.g., one or more processors, one or more memories), may communicate, directly or indirectly, with one another (e.g., via one or more buses).

The communications manager 720 may support wireless communication in accordance with examples as disclosed herein. The delay value component 725 is capable of, configured to, or operable to support a means for obtaining a first delay value associated with a small delay CDD scheme for a broadcast channel. The channel estimation component 730 is capable of, configured to, or operable to support a means for performing channel estimation for the broadcast channel in accordance with one or more delay spread values associated with a multi-path profile of the broadcast channel, where the one or more delay spread values are based on the first delay value associated with the small delay CDD scheme. The message component 735 is capable of, configured to, or operable to support a means for receiving a message via the broadcast channel based on performing the channel estimation.

In some examples, to support obtaining the first delay value, the candidate delay value component 740 is capable of, configured to, or operable to support a means for selecting the first delay value from a first set of candidate delay values associated with the broadcast channel.

In some examples, the candidate delay value component 740 is capable of, configured to, or operable to support a means for selecting the first set of candidate delay values from a set of multiple candidate delay values based on a frequency band associated with the broadcast channel. In some examples, the first delay value is in accordance with a basic time unit associated with the broadcast channel.

In some examples, the delay value component 725 is capable of, configured to, or operable to support a means for calculating a delay spread limit value based on the first delay value, where the channel estimation is performed in accordance with the delay spread limit value.

In some examples, the delay value component 725 is capable of, configured to, or operable to support a means for determining a delay spread distribution associated with the multi-path profile based on the first delay value, where the channel estimation is performed in accordance with the delay spread distribution.

In some examples, the delay value component 725 is capable of, configured to, or operable to support a means for obtaining a second delay value associated with the small delay CDD scheme for a control resource set scheduled via the broadcast channel. In some examples, the channel estimation component 730 is capable of, configured to, or operable to support a means for performing channel estimation for the control resource set in accordance with the second delay value. In some examples, the message component 735 is capable of, configured to, or operable to support a means for receiving a control message via the control resource set based on performing the channel estimation for the control resource set.

In some examples, to support obtaining the second delay value, the delay value component 725 is capable of, configured to, or operable to support a means for selecting the second delay value based on the first delay value such that the first delay value and the second delay value are the same.

In some examples, to support receiving the message via the broadcast channel, the delay value component 725 is capable of, configured to, or operable to support a means for receiving the message indicating the second delay value, where determining the second delay value is based on receiving the message. In some examples, the control resource set includes a default control resource set. In some examples, the control message schedules a system information block transmission.

In some examples, to support obtaining the first delay value, the message component 735 is capable of, configured to, or operable to support a means for receiving a control message scheduling the message via the broadcast channel, where the control message indicates the first delay value. In some examples, the control message indicates a bit value. In some examples, the first delay value is selected from a set of candidate delay values associated with the broadcast channel based on the bit value.

In some examples, the candidate delay value component 740 is capable of, configured to, or operable to support a means for selecting the set of candidate delay values based on a frequency band associated with the broadcast channel.

Additionally, or alternatively, the communications manager 720 may support wireless communication in accordance with examples as disclosed herein. The candidate delay value component 740 is capable of, configured to, or operable to support a means for receiving a first control message indicating a set of multiple candidate delay values associated with a small delay CDD scheme for a channel. In some examples, the delay value component 725 is capable of, configured to, or operable to support a means for receiving a second control message indicating, for a scheduled message, a delay value of the set of multiple candidate delay values that is applied for the scheduled message. In some examples, the channel estimation component 730 is capable of, configured to, or operable to support a means for performing channel estimation for the channel in accordance with one or more delay spread values associated with a multi-path profile of the channel, where the one or more delay spread values are based on the delay value that is applied for the scheduled message. In some examples, the message component 735 is capable of, configured to, or operable to support a means for receiving the scheduled message based on performing the channel estimation. In some examples, the first control message includes an RRC message. In some examples, the second control message includes a MAC-CE message.

In some examples, the candidate delay value component 740 is capable of, configured to, or operable to support a means for receiving, prior to receiving the second control message, a third control message that indicates a set of active delay values from the set of multiple candidate delay values, the set of active delay values including the delay value, where the set of active delay values are mapped to a codepoints of a downlink control information field of the second control message.

In some examples, to support receiving the second control message, the delay value component 725 is capable of, configured to, or operable to support a means for receiving the second control message including the downlink control information field, the downlink control information field indicating the delay value selected from the set of active delay values.

In some examples, the second control message includes a downlink control message and the third control message includes a MAC-CE message. In some examples, the first control message, the second control message, or both, are transmitted as part of a TCI indication procedure.

Figure 8:
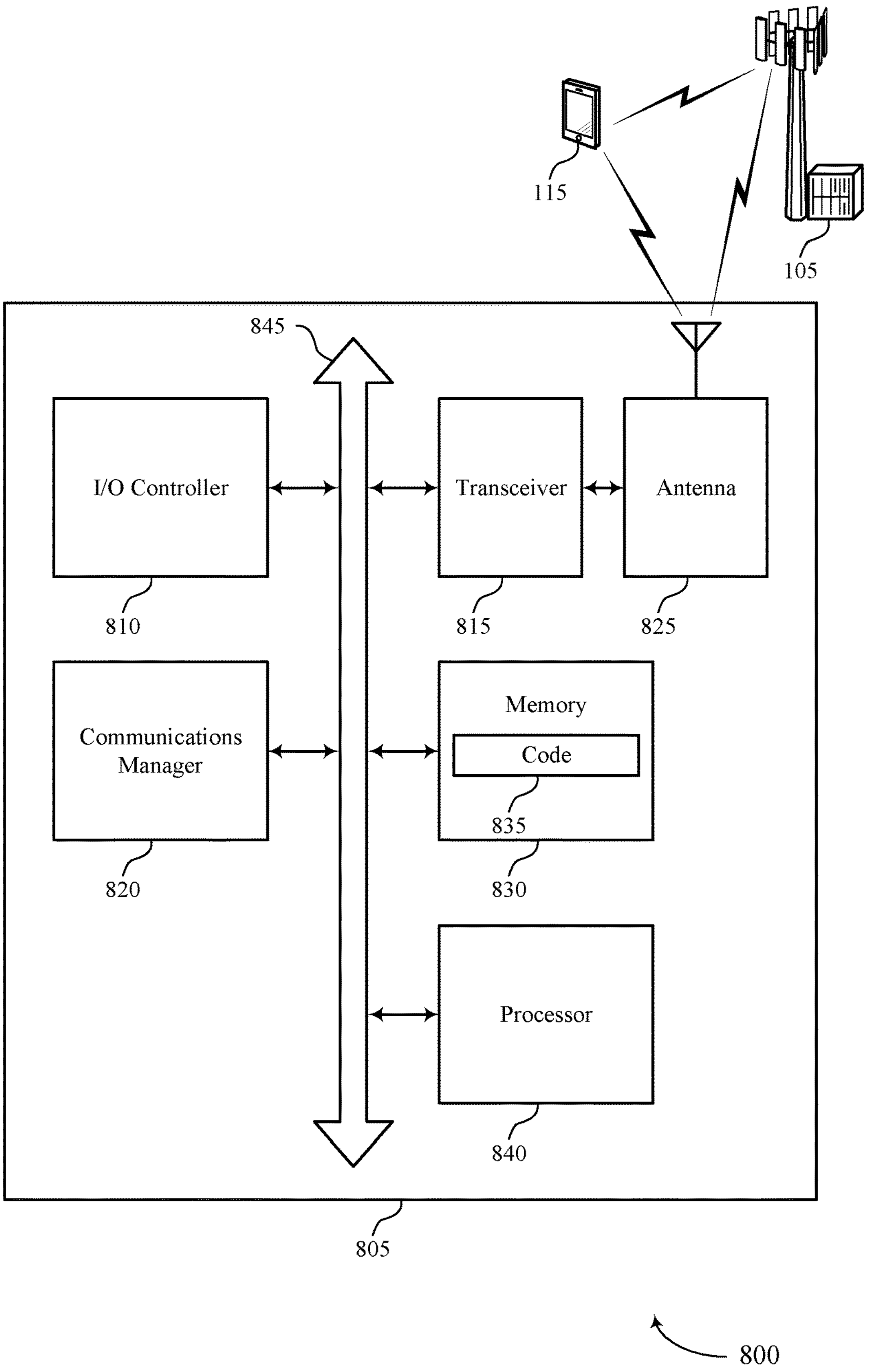
FIG. 8 shows a diagram of a system including a device that supports small delay CDD for data or control channels in accordance with one or more aspects of the present disclosure.

FIG. 8 shows a diagram of a system 800 including a device 805 that supports small delay CDD for data or control channels in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting small delay CDD for data or control channels). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. For example, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code stored in the at least one memory 830 or otherwise, to perform one or more of the functions described herein.

The communications manager 820 may support wireless communication in accordance with examples as disclosed herein. For example, the communications manager 820 is capable of, configured to, or operable to support a means for obtaining a first delay value associated with a small delay CDD scheme for a broadcast channel. The communications manager 820 is capable of, configured to, or operable to support a means for performing channel estimation for the broadcast channel in accordance with one or more delay spread values associated with a multi-path profile of the broadcast channel, where the one or more delay spread values are based on the first delay value associated with the small delay CDD scheme. The communications manager 820 is capable of, configured to, or operable to support a means for receiving a message via the broadcast channel based on performing the channel estimation.

Additionally, or alternatively, the communications manager 820 may support wireless communication in accordance with examples as disclosed herein. For example, the communications manager 820 is capable of, configured to, or operable to support a means for receiving a first control message indicating a set of multiple candidate delay values associated with a small delay CDD scheme for a channel. The communications manager 820 is capable of, configured to, or operable to support a means for receiving a second control message indicating, for a scheduled message, a delay value of the set of multiple candidate delay values that is applied for the scheduled message. The communications manager 820 is capable of, configured to, or operable to support a means for performing channel estimation for the channel in accordance with one or more delay spread values associated with a multi-path profile of the channel, where the one or more delay spread values are based on the delay value that is applied for the scheduled message. The communications manager 820 is capable of, configured to, or operable to support a means for receiving the scheduled message based on performing the channel estimation.

By including or configuring the communications manager 820 in accordance with examples as described herein, the device 805 may support techniques for a small delay CDD scheme for one or more channel types, which may increase diversity of a channel, thereby improving channel performance, reducing overhead (e.g., DMRS overhead) and latency, and improving communication stability between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of small delay CDD for data or control channels as described herein, or the at least one processor 840 and the at least one memory 830 may be otherwise configured to, individually or collectively, perform or support such operations.

Figure 9:
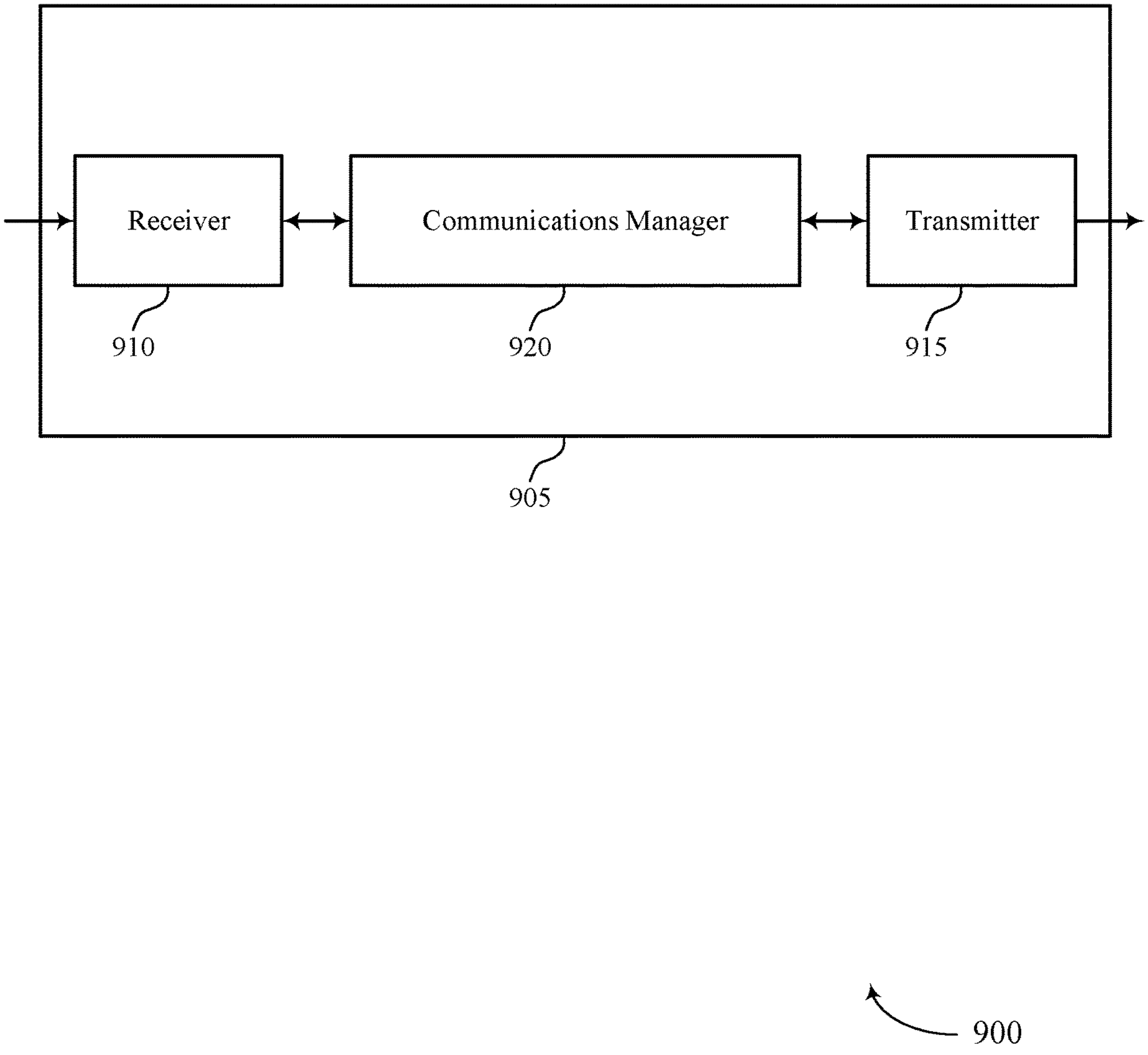
FIGS. 9 and 10 show block diagrams of devices that support small delay CDD for data or control channels in accordance with one or more aspects of the present disclosure.

FIG. 9 shows a block diagram 900 of a device 905 that supports small delay CDD for data or control channels in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of small delay CDD for data or control channels as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. For example, the communications manager 920 is capable of, configured to, or operable to support a means for obtaining a first delay value associated with a small delay CDD scheme for a broadcast channel. The communications manager 920 is capable of, configured to, or operable to support a means for outputting an indication of the first delay value, where the first delay value is associated with channel estimation for the broadcast channel in accordance with one or more delay spread values associated with a multi-path profile of the broadcast channel, and where the one or more delay spread values are based on the first delay value associated with the small delay CDD scheme. The communications manager 920 is capable of, configured to, or operable to support a means for outputting a message via the broadcast channel based on outputting the indication of the first delay value.

Additionally, or alternatively, the communications manager 920 may support wireless communication in accordance with examples as disclosed herein. For example, the communications manager 920 is capable of, configured to, or operable to support a means for outputting a first control message indicating a set of multiple candidate delay values associated with a small delay CDD scheme for a channel. The communications manager 920 is capable of, configured to, or operable to support a means for outputting a second control message indicating, for a scheduled message, a delay value of the set of multiple candidate delay values that is applied for the scheduled message. The communications manager 920 is capable of, configured to, or operable to support a means for outputting the scheduled message based on outputting the second control message.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for a small delay CDD scheme for a channel, thereby improving channel performance, reducing overhead (e.g., DMRS overhead) and latency, and improving communication stability between devices.

Figure 10:
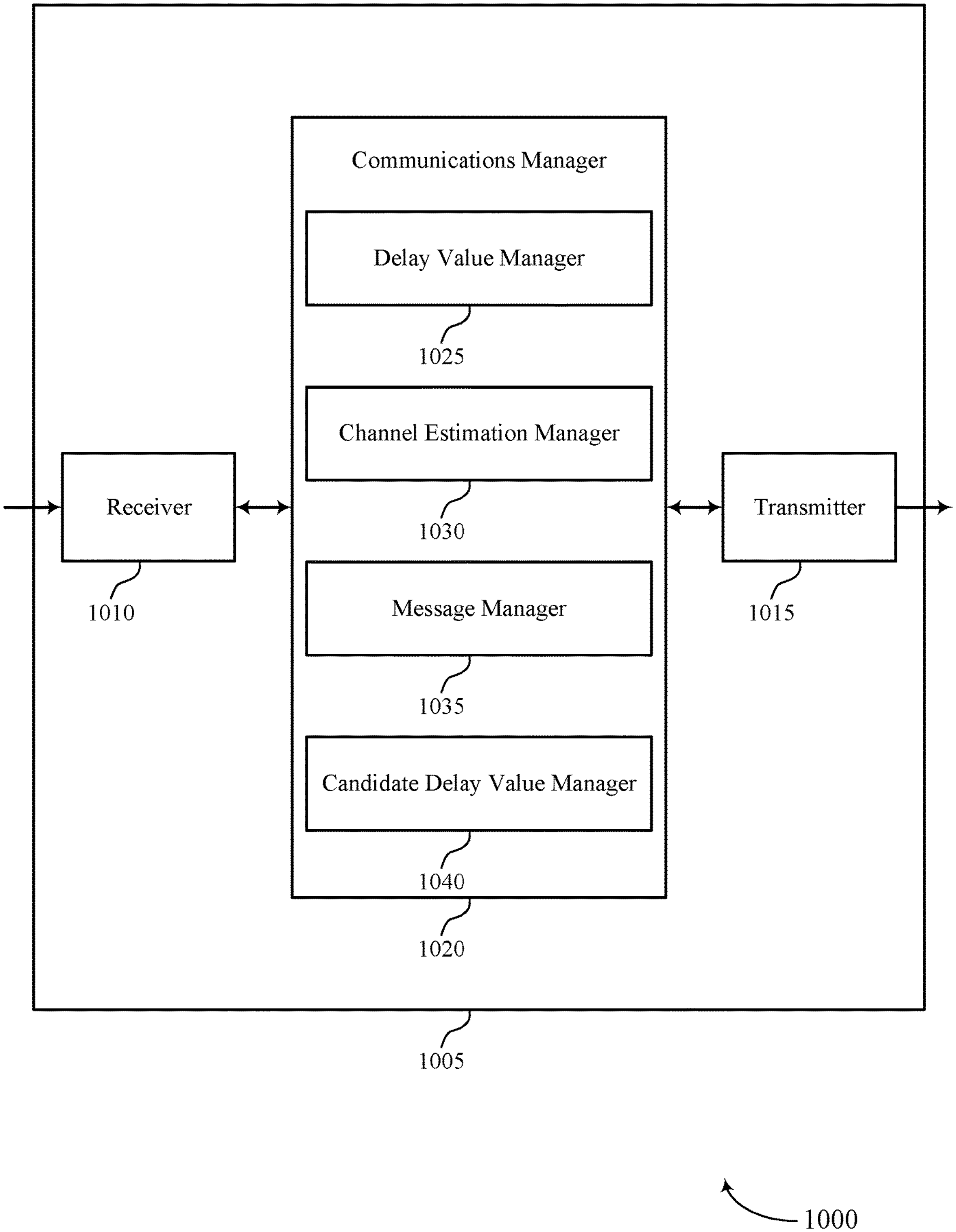

FIG. 10 shows a block diagram 1000 of a device 1005 that supports small delay CDD for data or control channels in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of small delay CDD for data or control channels as described herein. For example, the communications manager 1020 may include a delay value manager 1025, a channel estimation manager 1030, a message manager 1035, a candidate delay value manager 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication in accordance with examples as disclosed herein. The delay value manager 1025 is capable of, configured to, or operable to support a means for obtaining a first delay value associated with a small delay CDD scheme for a broadcast channel. The channel estimation manager 1030 is capable of, configured to, or operable to support a means for outputting an indication of the first delay value, where the first delay value is associated with channel estimation for the broadcast channel in accordance with one or more delay spread values associated with a multi-path profile of the broadcast channel, and where the one or more delay spread values are based on the first delay value associated with the small delay CDD scheme. The message manager 1035 is capable of, configured to, or operable to support a means for outputting a message via the broadcast channel based on outputting the indication of the first delay value.

Additionally, or alternatively, the communications manager 1020 may support wireless communication in accordance with examples as disclosed herein. The delay value manager 1025 is capable of, configured to, or operable to support a means for outputting a first control message indicating a set of multiple candidate delay values associated with a small delay CDD scheme for a channel. The candidate delay value manager 1040 is capable of, configured to, or operable to support a means for outputting a second control message indicating, for a scheduled message, a delay value of the set of multiple candidate delay values that is applied for the scheduled message. The message manager 1035 is capable of, configured to, or operable to support a means for outputting the scheduled message based on outputting the second control message.

Figure 11:
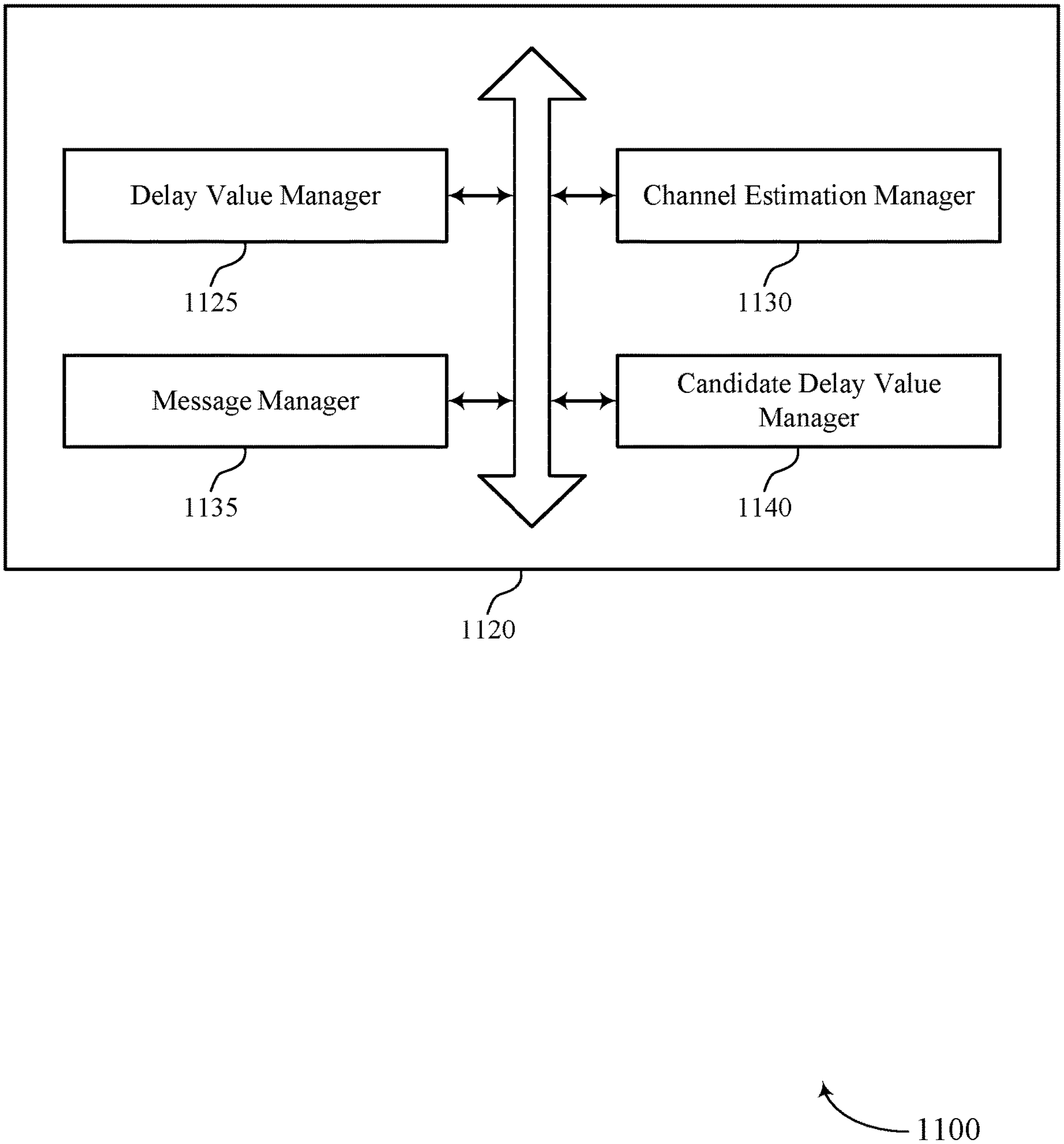
FIG. 11 shows a block diagram of a communications manager that supports small delay CDD for data or control channels in accordance with one or more aspects of the present disclosure.

FIG. 11 shows a block diagram 1100 of a communications manager 1120 that supports small delay CDD for data or control channels in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of small delay CDD for data or control channels as described herein. For example, the communications manager 1120 may include a delay value manager 1125, a channel estimation manager 1130, a message manager 1135, a candidate delay value manager 1140, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication in accordance with examples as disclosed herein. The delay value manager 1125 is capable of, configured to, or operable to support a means for obtaining a first delay value associated with a small delay CDD scheme for a broadcast channel. The channel estimation manager 1130 is capable of, configured to, or operable to support a means for outputting an indication of the first delay value, where the first delay value is associated with channel estimation for the broadcast channel in accordance with one or more delay spread values associated with a multi-path profile of the broadcast channel, and where the one or more delay spread values are based on the first delay value associated with the small delay CDD scheme. The message manager 1135 is capable of, configured to, or operable to support a means for outputting a message via the broadcast channel based on outputting the indication of the first delay value.

In some examples, to support obtaining the first delay value, the candidate delay value manager 1140 is capable of, configured to, or operable to support a means for selecting the first delay value from a first set of candidate delay values associated with the broadcast channel.

In some examples, the candidate delay value manager 1140 is capable of, configured to, or operable to support a means for selecting the first set of candidate delay values from a set of multiple candidate delay values based on a frequency band associated with the broadcast channel. In some examples, the first delay value is determined based on a basic time unit associated with the broadcast channel.

In some examples, the delay value manager 1125 is capable of, configured to, or operable to support a means for obtaining a second delay value associated with the small delay CDD scheme for a control resource set scheduled via the broadcast channel. In some examples, the channel estimation manager 1130 is capable of, configured to, or operable to support a means for outputting an indication of the second delay value, where the second delay value is associated with channel estimation for the control resource set. In some examples, the message manager 1135 is capable of, configured to, or operable to support a means for obtaining a control message via the control resource set based on outputting the indication of the second delay value.

In some examples, to support obtaining the second delay value, the delay value manager 1125 is capable of, configured to, or operable to support a means for selecting the second delay value based on the first delay value such that the first delay value and the second delay value are the same.

In some examples, to support outputting the message via the broadcast channel, the message manager 1135 is capable of, configured to, or operable to support a means for outputting the message indicating the second delay value, where outputting the indication of the second delay value includes outputting the message via the broadcast channel. In some examples, the control resource set includes a default control resource set. In some examples, the control message schedules a system information block transmission.

In some examples, to support outputting the indication of the first delay value, the message manager 1135 is capable of, configured to, or operable to support a means for outputting a control message scheduling the message via the broadcast channel, where the control message indicates the first delay value.

In some examples, the control message indicates a bit value. In some examples, the first delay value is selected from a set of candidate delay values associated with the broadcast channel based on the bit value.

In some examples, the candidate delay value manager 1140 is capable of, configured to, or operable to support a means for selecting the set of candidate delay values based on a frequency band associated with the broadcast channel.

Additionally, or alternatively, the communications manager 1120 may support wireless communication in accordance with examples as disclosed herein. In some examples, the delay value manager 1125 is capable of, configured to, or operable to support a means for outputting a first control message indicating a set of multiple candidate delay values associated with a small delay CDD scheme for a channel. The candidate delay value manager 1140 is capable of, configured to, or operable to support a means for outputting a second control message indicating, for a scheduled message, a delay value of the set of multiple candidate delay values that is applied for the scheduled message. In some examples, the message manager 1135 is capable of, configured to, or operable to support a means for outputting the scheduled message based on outputting the second control message. In some examples, the first control message includes an RRC message. In some examples, the second control message is or includes a MAC-CE message.

In some examples, the candidate delay value manager 1140 is capable of, configured to, or operable to support a means for outputting, prior to outputting the second control message, a third control message that indicates a set of active delay values from the set of multiple candidate delay values, the set of active delay values including the delay value, where the set of active delay values are mapped to a codepoints of a downlink control information field of the second control message.

In some examples, to support outputting the second control message, the delay value manager 1125 is capable of, configured to, or operable to support a means for outputting the second control message including the downlink control information field, the downlink control information field indicating the delay value selected from the set of active delay values.

In some examples, the second control message includes a downlink control message and the third control message is or includes a MAC-CE message. In some examples, the first control message, the second control message, or both, are output as part of a TCI indication procedure.

Figure 12:
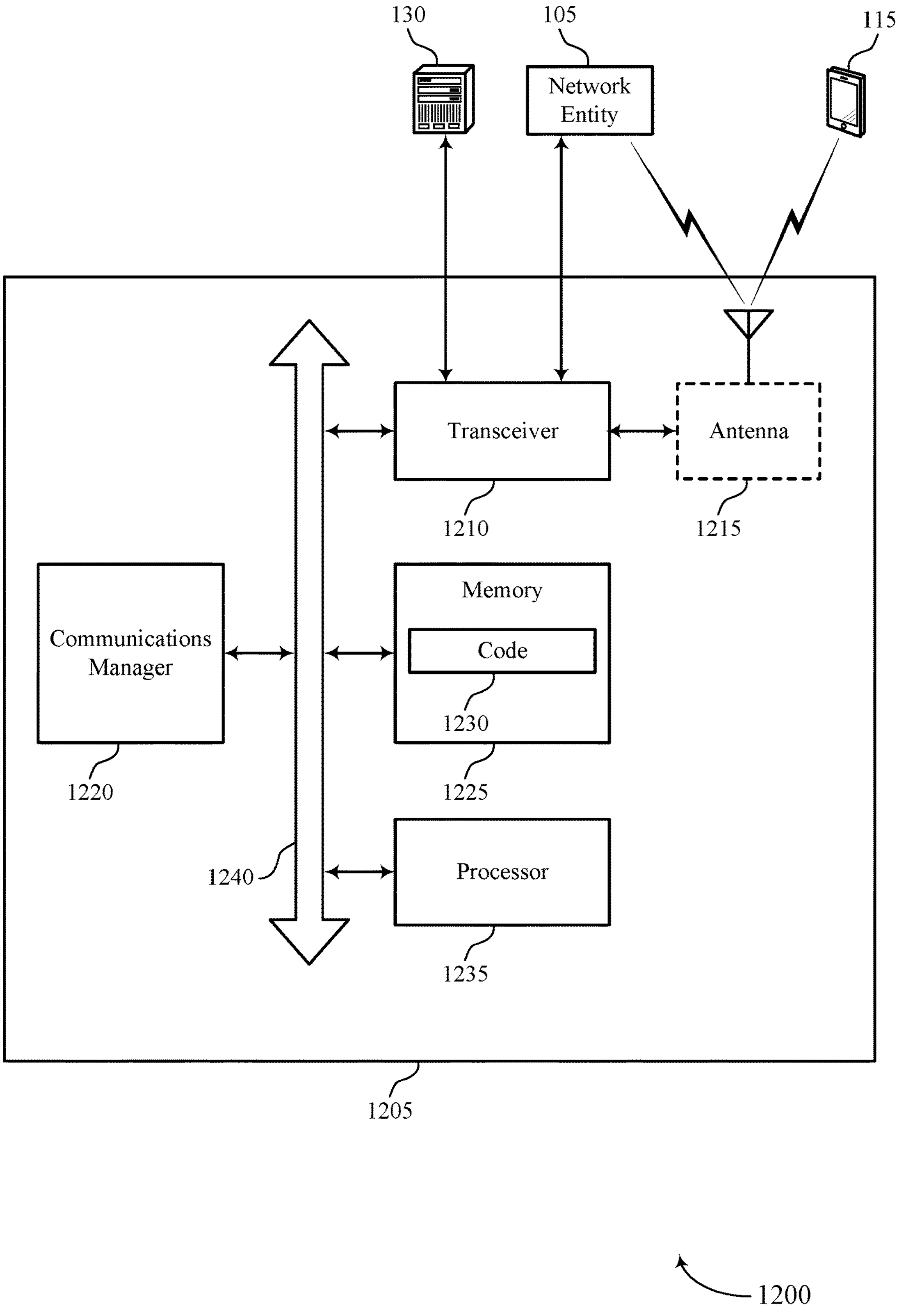
FIG. 12 shows a diagram of a system including a device that supports small delay CDD for data or control channels in accordance with one or more aspects of the present disclosure.

FIG. 12 shows a diagram of a system 1200 including a device 1205 that supports small delay CDD for data or control channels in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting small delay CDD for data or control channels). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. For example, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication in accordance with examples as disclosed herein. For example, the communications manager 1220 is capable of, configured to, or operable to support a means for obtaining a first delay value associated with a small delay CDD scheme for a broadcast channel. The communications manager 1220 is capable of, configured to, or operable to support a means for outputting an indication of the first delay value, where the first delay value is associated with channel estimation for the broadcast channel in accordance with one or more delay spread values associated with a multi-path profile of the broadcast channel, and where the one or more delay spread values are based on the first delay value associated with the small delay CDD scheme. The communications manager 1220 is capable of, configured to, or operable to support a means for outputting a message via the broadcast channel based on outputting the indication of the first delay value.

Additionally, or alternatively, the communications manager 1220 may support wireless communication in accordance with examples as disclosed herein. For example, the communications manager 1220 is capable of, configured to, or operable to support a means for outputting a first control message indicating a set of multiple candidate delay values associated with a small delay CDD scheme for a channel. The communications manager 1220 is capable of, configured to, or operable to support a means for outputting a second control message indicating, for a scheduled message, a delay value of the set of multiple candidate delay values that is applied for the scheduled message. The communications manager 1220 is capable of, configured to, or operable to support a means for outputting the scheduled message based on outputting the second control message.

By including or configuring the communications manager 1220 in accordance with examples as described herein, the device 1205 may support techniques for a small delay CDD scheme for a channel, thereby improving channel performance, reducing overhead (e.g., DMRS overhead) and latency, and improving communication stability between devices.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of small delay CDD for data or control channels as described herein, or the at least one processor 1235 and the at least one memory 1225 may be otherwise configured to, individually or collectively, perform or support such operations.

Figure 13:
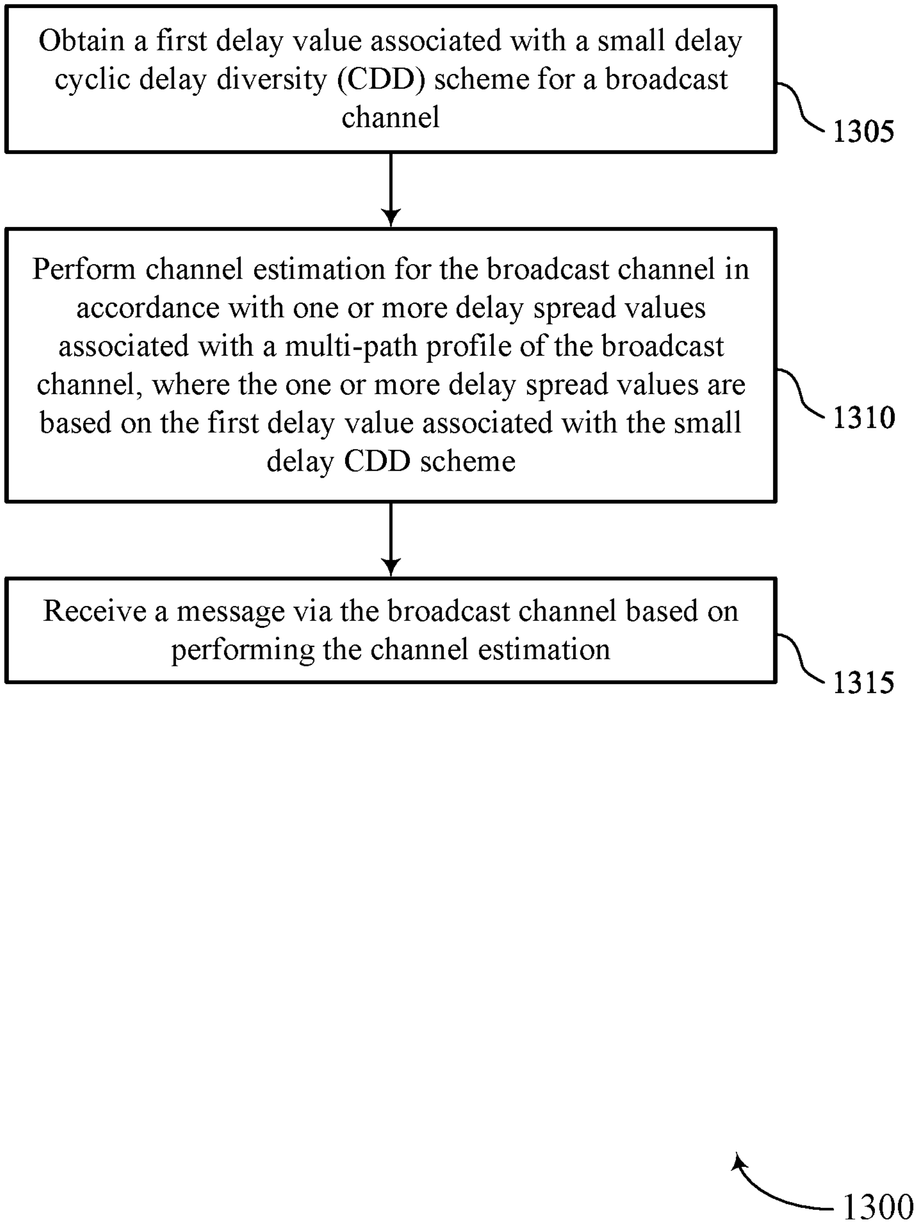
FIGS. 13 through 16 show flowcharts illustrating methods that support small delay CDD for data or control channels in accordance with one or more aspects of the present disclosure.

FIG. 13 shows a flowchart illustrating a method 1300 that supports small delay CDD for data or control channels in accordance with examples as disclosed herein. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include obtaining a first delay value associated with a small delay CDD scheme for a broadcast channel. The operations of block 1305 may be performed in accordance with examples as disclosed herein. In some examples, aspects of the operations of 1305 may be performed by a delay value component 725 as described with reference to FIG. 7.

At 1310, the method may include performing channel estimation for the broadcast channel in accordance with one or more delay spread values associated with a multi-path profile of the broadcast channel, where the one or more delay spread values are based on the first delay value associated with the small delay CDD scheme. The operations of block 1310 may be performed in accordance with examples as disclosed herein. In some examples, aspects of the operations of 1310 may be performed by a channel estimation component 730 as described with reference to FIG. 7.

At 1315, the method may include receiving a message via the broadcast channel based on performing the channel estimation. The operations of block 1315 may be performed in accordance with examples as disclosed herein. In some examples, aspects of the operations of 1315 may be performed by a message component 735 as described with reference to FIG. 7.

Figure 14:
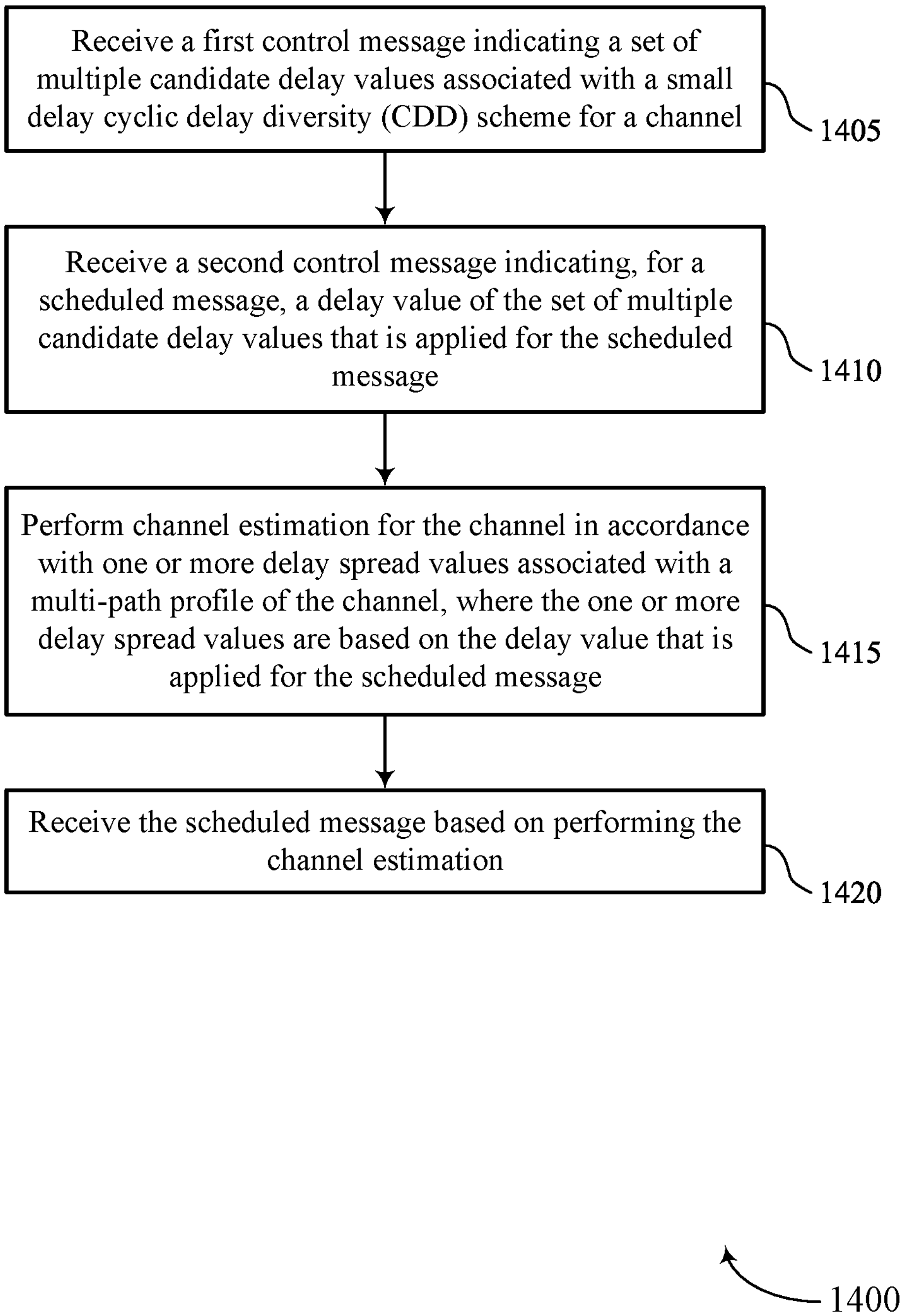

FIG. 14 shows a flowchart illustrating a method 1400 that supports small delay CDD for data or control channels in accordance with examples as disclosed herein. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving a first control message indicating a set of multiple candidate delay values associated with a small delay CDD scheme for a channel. The operations of block 1405 may be performed in accordance with examples as disclosed herein. In some examples, aspects of the operations of 1405 may be performed by a candidate delay value component 740 as described with reference to FIG. 7.

At 1410, the method may include receiving a second control message indicating, for a scheduled message, a delay value of the set of multiple candidate delay values that is applied for the scheduled message. The operations of block 1410 may be performed in accordance with examples as disclosed herein. In some examples, aspects of the operations of 1410 may be performed by a delay value component 725 as described with reference to FIG. 7.

At 1415, the method may include performing channel estimation for the channel in accordance with one or more delay spread values associated with a multi-path profile of the channel, where the one or more delay spread values are based on the delay value that is applied for the scheduled message. The operations of block 1415 may be performed in accordance with examples as disclosed herein. In some examples, aspects of the operations of 1415 may be performed by a channel estimation component 730 as described with reference to FIG. 7.

At 1420, the method may include receiving the scheduled message based on performing the channel estimation. The operations of block 1420 may be performed in accordance with examples as disclosed herein. In some examples, aspects of the operations of 1420 may be performed by a message component 735 as described with reference to FIG. 7.

Figure 15:
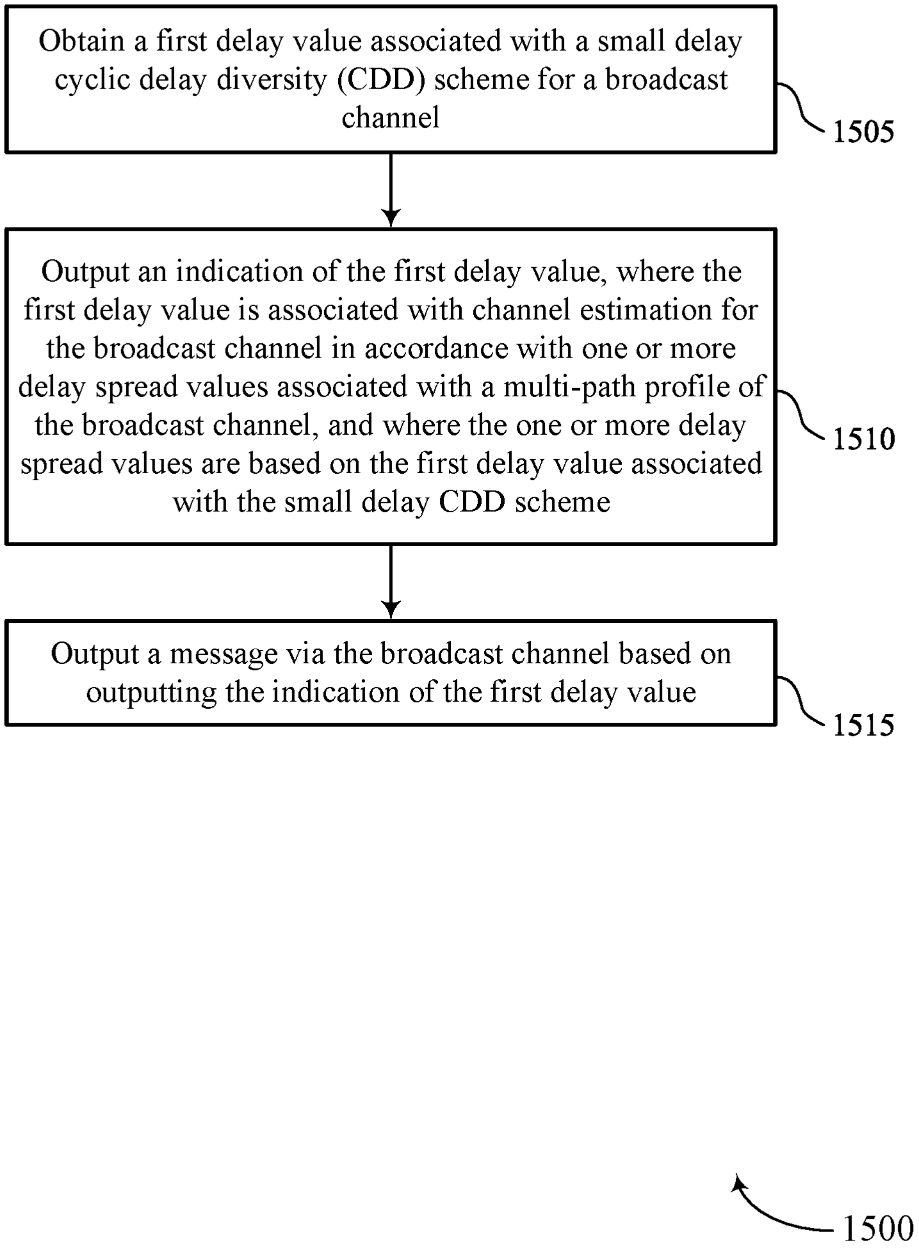

FIG. 15 shows a flowchart illustrating a method 1500 that supports small delay CDD for data or control channels in accordance with examples as disclosed herein. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include obtaining a first delay value associated with a small delay CDD scheme for a broadcast channel. The operations of block 1505 may be performed in accordance with examples as disclosed herein. In some examples, aspects of the operations of 1505 may be performed by a delay value manager 1125 as described with reference to FIG. 11.

At 1510, the method may include outputting an indication of the first delay value, where the first delay value is associated with channel estimation for the broadcast channel in accordance with one or more delay spread values associated with a multi-path profile of the broadcast channel, and where the one or more delay spread values are based on the first delay value associated with the small delay CDD scheme. The operations of block 1510 may be performed in accordance with examples as disclosed herein. In some examples, aspects of the operations of 1510 may be performed by a channel estimation manager 1130 as described with reference to FIG. 11.

At 1515, the method may include outputting a message via the broadcast channel based on outputting the indication of the first delay value. The operations of block 1515 may be performed in accordance with examples as disclosed herein. In some examples, aspects of the operations of 1515 may be performed by a message manager 1135 as described with reference to FIG. 11.

Figure 16:
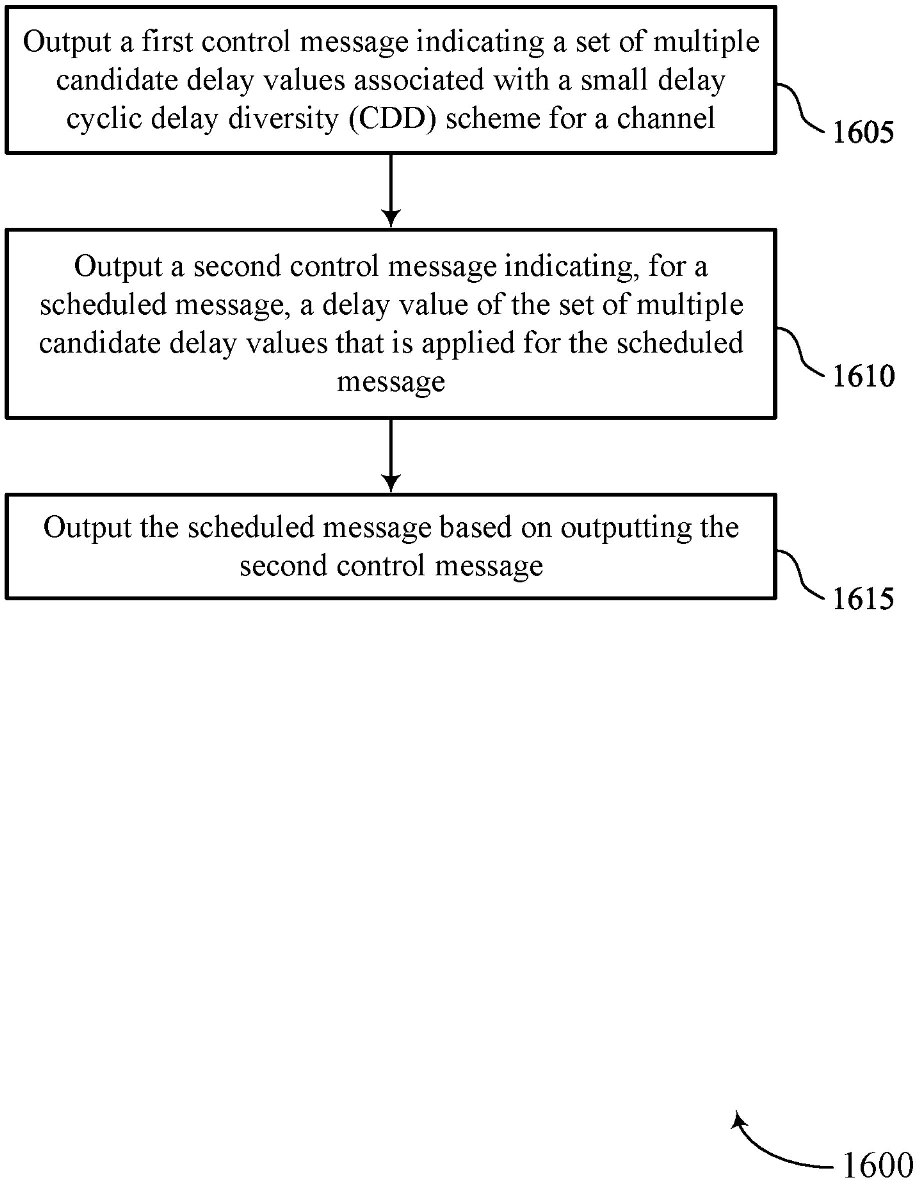

FIG. 16 shows a flowchart illustrating a method 1600 that supports small delay CDD for data or control channels in accordance with examples as disclosed herein. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include outputting a first control message indicating a set of multiple candidate delay values associated with a small delay CDD scheme for a channel. The operations of block 1605 may be performed in accordance with examples as disclosed herein. In some examples, aspects of the operations of 1605 may be performed by a delay value manager 1125 as described with reference to FIG. 11.

At 1610, the method may include outputting a second control message indicating, for a scheduled message, a delay value of the set of multiple candidate delay values that is applied for the scheduled message. The operations of block 1610 may be performed in accordance with examples as disclosed herein. In some examples, aspects of the operations of 1610 may be performed by a candidate delay value manager 1140 as described with reference to FIG. 11.

At 1615, the method may include outputting the scheduled message based on outputting the second control message. The operations of block 1615 may be performed in accordance with examples as disclosed herein. In some examples, aspects of the operations of 1615 may be performed by a message manager 1135 as described with reference to FIG. 11.

The following provides an overview of aspects of the present disclosure:

Aspect 1: A method for wireless communication by a UE, comprising: obtaining a first delay value associated with a small delay CDD scheme for a broadcast channel; performing channel estimation for the broadcast channel in accordance with one or more delay spread values associated with a multi-path profile of the broadcast channel, wherein the one or more delay spread values are based at least in part on the first delay value associated with the small delay CDD scheme; and receiving a message via the broadcast channel based at least in part on performing the channel estimation.

Aspect 2: The method of aspect 1, wherein obtaining the first delay value further comprises: selecting the first delay value from a first set of candidate delay values associated with the broadcast channel.

Aspect 3: The method of aspect 2, further comprising: selecting the first set of candidate delay values from a plurality of candidate delay values based at least in part on a frequency band associated with the broadcast channel.

Aspect 4: The method of any of aspects 1 through 3, wherein the first delay value is in accordance with a basic time unit associated with the broadcast channel.

Aspect 5: The method of any of aspects 1 through 4, further comprising: calculating a delay spread limit value based at least in part on the first delay value, wherein the channel estimation is performed in accordance with the delay spread limit value.

Aspect 6: The method of any of aspects 1 through 5, further comprising: determining a delay spread distribution associated with the multi-path profile based at least in part on the first delay value, wherein the channel estimation is performed in accordance with the delay spread distribution.

Aspect 7: The method of any of aspects 1 through 6, further comprising: obtaining a second delay value associated with the small delay CDD scheme for a control resource set scheduled via the broadcast channel; performing channel estimation for the control resource set in accordance with the second delay value; and receiving a control message via the control resource set based at least in part on performing the channel estimation for the control resource set.

Aspect 8: The method of aspect 7, wherein obtaining the second delay value further comprises: selecting the second delay value based at least in part on the first delay value such that the first delay value and the second delay value are the same.

Aspect 9: The method of any of aspects 7 through 8, wherein receiving the message via the broadcast channel further comprises: receiving the message indicating the second delay value, wherein determining the second delay value is based at least in part on receiving the message.

Aspect 10: The method of any of aspects 7 through 9, wherein the control resource set comprises a default control resource set, and the control message schedules a system information block transmission.

Aspect 11: The method of any of aspects 1 through 10, wherein obtaining the first delay value further comprises: receiving a control message scheduling the message via the broadcast channel, wherein the control message indicates the first delay value.

Aspect 12: The method of aspect 11, wherein the control message indicates a bit value, and the first delay value is selected from a set of candidate delay values associated with the broadcast channel based at least in part on the bit value.

Aspect 13: The method of aspect 12, further comprising: selecting the set of candidate delay values based at least in part on a frequency band associated with the broadcast channel.

Aspect 14: A method for wireless communication by a UE, comprising: receiving a first control message indicating a plurality of candidate delay values associated with a small delay CDD scheme for a channel; receiving a second control message indicating, for a scheduled message, a delay value of the plurality of candidate delay values that is applied for the scheduled message; performing channel estimation for the channel in accordance with one or more delay spread values associated with a multi-path profile of the channel, wherein the one or more delay spread values are based at least in part on the delay value that is applied for the scheduled message; and receiving the scheduled message based at least in part on performing the channel estimation.

Aspect 15: The method of aspect 14, wherein the first control message comprises an RRC message.

Aspect 16: The method of any of aspects 14 through 15, wherein the second control message comprises a MAC-CE message.

Aspect 17: The method of any of aspects 14 through 16, further comprising: receiving, prior to receiving the second control message, a third control message that indicates a set of active delay values from the plurality of candidate delay values, the set of active delay values including the delay value, wherein the set of active delay values are mapped to a codepoints of a downlink control information field of the second control message.

Aspect 18: The method of aspect 17, wherein receiving the second control message further comprises: receiving the second control message comprising the downlink control information field, the downlink control information field indicating the delay value selected from the set of active delay values.

Aspect 19: The method of aspect 18, wherein the second control message comprises a downlink control message and the third control message comprises a MAC-CE message.

Aspect 20: The method of any of aspects 14 through 19, wherein the first control message, the second control message, or both, are transmitted as part of a TCI indication procedure.

Aspect 21: A method for wireless communication by a network entity, comprising: obtaining a first delay value associated with a small delay CDD scheme for a broadcast channel; outputting an indication of the first delay value, wherein the first delay value is associated with channel estimation for the broadcast channel in accordance with one or more delay spread values associated with a multi-path profile of the broadcast channel, and wherein the one or more delay spread values are based at least in part on the first delay value associated with the small delay CDD scheme; and outputting a message via the broadcast channel based at least in part on outputting the indication of the first delay value.

Aspect 22: The method of aspect 21, wherein obtaining the first delay value further comprises: selecting the first delay value from a first set of candidate delay values associated with the broadcast channel.

Aspect 23: The method of aspect 22, further comprising: selecting the first set of candidate delay values from a plurality of candidate delay values based at least in part on a frequency band associated with the broadcast channel.

Aspect 24: The method of any of aspects 21 through 23, wherein the first delay value is determined based at least in part on a basic time unit associated with the broadcast channel.

Aspect 25: The method of any of aspects 21 through 24, further comprising: obtaining a second delay value associated with the small delay CDD scheme for a control resource set scheduled via the broadcast channel; outputting an indication of the second delay value, wherein the second delay value is associated with channel estimation for the control resource set; and obtaining a control message via the control resource set based at least in part on outputting the indication of the second delay value.

Aspect 26: The method of aspect 25, wherein obtaining the second delay value further comprises: selecting the second delay value based at least in part on the first delay value such that the first delay value and the second delay value are the same.

Aspect 27: The method of any of aspects 25 through 26, wherein outputting the message via the broadcast channel further comprises: outputting the message indicating the second delay value, wherein outputting the indication of the second delay value comprises outputting the message via the broadcast channel.

Aspect 28: The method of any of aspects 25 through 27, wherein the control resource set comprises a default control resource set, and the control message schedules a system information block transmission.

Aspect 29: The method of any of aspects 21 through 28, wherein outputting the indication of the first delay value further comprises: outputting a control message scheduling the message via the broadcast channel, wherein the control message indicates the first delay value.

Aspect 30: The method of aspect 29, wherein the control message indicates a bit value, and the first delay value is selected from a set of candidate delay values associated with the broadcast channel based at least in part on the bit value.

Aspect 31: The method of aspect 30, further comprising: selecting the set of candidate delay values based at least in part on a frequency band associated with the broadcast channel.

Aspect 32: A method for wireless communication by a network entity, comprising: outputting a first control message indicating a plurality of candidate delay values associated with a small delay CDD scheme for a channel; outputting a second control message indicating, for a scheduled message, a delay value of the plurality of candidate delay values that is applied for the scheduled message; and outputting the scheduled message based at least in part on outputting the second control message.

Aspect 33: The method of aspect 32, wherein the first control message comprises an RRC message.

Aspect 34: The method of any of aspects 32 through 33, wherein the second control message comprises a MAC-CE message.

Aspect 35: The method of any of aspects 32 through 34, further comprising: outputting, prior to outputting the second control message, a third control message that indicates a set of active delay values from the plurality of candidate delay values, the set of active delay values including the delay value, wherein the set of active delay values are mapped to a codepoints of a downlink control information field of the second control message.

Aspect 36: The method of aspect 35, wherein outputting the second control message further comprises: outputting the second control message comprising the downlink control information field, the downlink control information field indicating the delay value selected from the set of active delay values.

Aspect 37: The method of aspect 36, wherein the second control message comprises a downlink control message and the third control message comprises a MAC-CE message.

Aspect 38: The method of any of aspects 32 through 37, wherein the first control message, the second control message, or both, are output as part of a TCI indication procedure.

Aspect 39: A UE for wireless communication, comprising one or more memories storing processor-executable code, and one or more processors coupled with the one or more memories and individually or collectively operable to execute the code to cause the UE to perform a method of any of aspects 1 through 13.

Aspect 40: A UE for wireless communication, comprising at least one means for performing a method of any of aspects 1 through 13.

Aspect 41: A non-transitory computer-readable medium storing code for wireless communication, the code comprising instructions executable by one or more processors to perform a method of any of aspects 1 through 13.

Aspect 42: A UE for wireless communication, comprising one or more memories storing processor-executable code, and one or more processors coupled with the one or more memories and individually or collectively operable to execute the code to cause the UE to perform a method of any of aspects 14 through 20.

Aspect 43: A UE for wireless communication, comprising at least one means for performing a method of any of aspects 14 through 20.

Aspect 44: A non-transitory computer-readable medium storing code for wireless communication, the code comprising instructions executable by one or more processors to perform a method of any of aspects 14 through 20.

Aspect 45: A network entity for wireless communication, comprising one or more memories storing processor-executable code, and one or more processors coupled with the one or more memories and individually or collectively operable to execute the code to cause the network entity to perform a method of any of aspects 21 through 31.

Aspect 46: A network entity for wireless communication, comprising at least one means for performing a method of any of aspects 21 through 31.

Aspect 47: A non-transitory computer-readable medium storing code for wireless communication, the code comprising instructions executable by one or more processors to perform a method of any of aspects 21 through 31.

Aspect 48: A network entity for wireless communication, comprising one or more memories storing processor-executable code, and one or more processors coupled with the one or more memories and individually or collectively operable to execute the code to cause the network entity to perform a method of any of aspects 32 through 38.

Aspect 49: A network entity for wireless communication, comprising at least one means for performing a method of any of aspects 32 through 38.

Aspect 50: A non-transitory computer-readable medium storing code for wireless communication, the code comprising instructions executable by one or more processors to perform a method of any of aspects 32 through 38.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

select a first set of candidate delay values from a plurality of candidate delay values based at least in part on a frequency band associated with a broadcast channel;

obtain a first delay value associated with a small delay cyclic delay diversity (CDD) scheme for the broadcast channel, wherein the first delay value is in the first set of candidate delay values;

perform channel estimation for the broadcast channel in accordance with one or more delay spread values associated with a multi-path profile of the broadcast channel, wherein the one or more delay spread values are based at least in part on the first delay value associated with the small delay CDD scheme; and receive a message via the broadcast channel based at least in part on performing the channel estimation.

2. The UE of claim 1, wherein the first delay value is in accordance with a basic time unit associated with the broadcast channel.

3. The UE of claim 1, wherein the one or more processors are individually or collectively further operable to execute the code to cause the UE to:

calculate a delay spread limit value based at least in part on the first delay value, wherein the channel estimation is performed in accordance with the delay spread limit value.

4. The UE of claim 1, wherein the one or more processors are individually or collectively further operable to execute the code to cause the UE to:

determine a delay spread distribution associated with the multi-path profile based at least in part on the first delay value, wherein the channel estimation is performed in accordance with the delay spread distribution.

5. The UE of claim 1, wherein the one or more processors are individually or collectively further operable to execute the code to cause the UE to:

obtain a second delay value associated with the small delay CDD scheme for a control resource set scheduled via the broadcast channel;

perform channel estimation for the control resource set in accordance with the second delay value; and receive a control message via the control resource set based at least in part on performing the channel estimation for the control resource set.

6. The UE of claim 5, wherein, to obtain the second delay value, the one or more processors are individually or collectively further operable to execute the code to cause the UE to:

select the second delay value based at least in part on the first delay value such that the first delay value and the second delay value are the same.

7. The UE of claim 5, wherein, to receive the message via the broadcast channel, the one or more processors are individually or collectively further operable to execute the code to cause the UE to:

receive the message indicating the second delay value, wherein determining the second delay value is based at least in part on receiving the message.

8. The UE of claim 5, wherein the control resource set comprises a default control resource set, and wherein the control message schedules a system information block transmission.

9. The UE of claim 1, wherein, to obtain the first delay value, the one or more processors are individually or collectively further operable to execute the code to cause the UE to:

receive a control message scheduling the message via the broadcast channel, wherein the control message indicates the first delay value.

10. The UE of claim 9, wherein the control message indicates a bit value, and wherein the first delay value is selected from a set of candidate delay values associated with the broadcast channel based at least in part on the bit value.

11. The UE of claim 10, wherein the one or more processors are individually or collectively further operable to execute the code to cause the UE to:

select the set of candidate delay values based at least in part on a frequency band associated with the broadcast channel.

12. A user equipment (UE), comprising:

one or more memories storing processor-executable code; and one or more processors coupled with the one or more memories and individually or collectively operable to execute the code to cause the UE to:

receive a first control message indicating a plurality of candidate delay values associated with a small delay cyclic delay diversity (CDD) scheme for a channel;

receive a second control message indicating, for a scheduled message, a delay value of the plurality of candidate delay values that is applied for the scheduled message;

perform channel estimation for the channel in accordance with one or more delay spread values associated with a multi-path profile of the channel, wherein the one or more delay spread values are based at least in part on the delay value that is applied for the scheduled message; and receive the scheduled message based at least in part on performing the channel estimation.

13. The UE of claim 12, wherein the first control message comprises a radio resource control (RRC) message.

14. The UE of claim 12, wherein the second control message comprises a medium access control-control element (MAC-CE) message.

15. The UE of claim 12, wherein the one or more processors are individually or collectively further operable to execute the code to cause the UE to:

receive, prior to receiving the second control message, a third control message that indicates a set of active delay values from the plurality of candidate delay values, the set of active delay values including the delay value, wherein the set of active delay values are mapped to codepoints of a downlink control information field of the second control message.

16. The UE of claim 15, wherein, to receive the second control message, the one or more processors are individually or collectively further operable to execute the code to cause the UE to:

receive the second control message comprising the downlink control information field, the downlink control information field indicating the delay value selected from the set of active delay values.

17. The UE of claim 16, wherein the second control message comprises a downlink control message and the third control message comprises a medium access control-control element (MAC-CE) message.

18. The UE of claim 12, wherein the first control message, the second control message, or both, are transmitted as part of a transmission configuration indicator (TCI) indication procedure.

19. A network entity, comprising:

one or more memories storing processor-executable code; and one or more processors coupled with the one or more memories and individually or collectively operable to execute the code to cause the network entity to:

select a first set of candidate delay values from a plurality of candidate delay values based at least in part on a frequency band associated with a broadcast channel;

obtain a first delay value associated with a small delay cyclic delay diversity (CDD) scheme for the broadcast channel, wherein the first delay value is in the first set of candidate delay values;

output an indication of the first delay value, wherein the first delay value is associated with channel estimation for the broadcast channel in accordance with one or more delay spread values associated with a multi-path profile of the broadcast channel, and wherein the one or more delay spread values are based at least in part on the first delay value associated with the small delay CDD scheme; and output a message via the broadcast channel based at least in part on outputting the indication of the first delay value.

20. The network entity of claim 19, wherein the first delay value is determined based at least in part on a basic time unit associated with the broadcast channel.

21. The network entity of claim 19, wherein the one or more processors are individually or collectively further operable to execute the code to cause the network entity to:

obtain a second delay value associated with the small delay CDD scheme for a control resource set scheduled via the broadcast channel;

output an indication of the second delay value, wherein the second delay value is associated with channel estimation for the control resource set; and obtain a control message via the control resource set based at least in part on outputting the indication of the second delay value.

22. The network entity of claim 21, wherein, to obtain the second delay value, the one or more processors are individually or collectively further operable to execute the code to cause the network entity to:

select the second delay value based at least in part on the first delay value such that the first delay value and the second delay value are the same.

23. The network entity of claim 21, wherein, to output the message via the broadcast channel, the one or more processors are individually or collectively further operable to execute the code to cause the network entity to:

output the message indicating the second delay value, wherein outputting the indication of the second delay value comprises outputting the message via the broadcast channel.

24. The network entity of claim 19, wherein, to output the indication of the first delay value, the one or more processors are individually or collectively further operable to execute the code to cause the network entity to:

output a control message scheduling the message via the broadcast channel, wherein the control message indicates the first delay value.

25. A network entity, comprising:

one or more memories storing processor-executable code; and one or more processors coupled with the one or more memories and individually or collectively operable to execute the code to cause the network entity to:

output a first control message indicating a plurality of candidate delay values associated with a small delay cyclic delay diversity (CDD) scheme for a channel;

output a second control message indicating, for a scheduled message, a delay value of the plurality of candidate delay values that is applied for the scheduled message; and output the scheduled message based at least in part on outputting the second control message.

26. The network entity of claim 25, wherein the first control message comprises a radio resource control (RRC) message.

27. The network entity of claim 25, wherein the one or more processors are individually or collectively further operable to execute the code to cause the network entity to:

output, prior to outputting the second control message, a third control message that indicates a set of active delay values from the plurality of candidate delay values, the set of active delay values including the delay value, wherein the set of active delay values are mapped to codepoints of a downlink control information field of the second control message.

28. The network entity of claim 27, wherein, to output the second control message, the one or more processors are individually or collectively further operable to execute the code to cause the network entity to:

output the second control message comprising the downlink control information field, the downlink control information field indicating the delay value selected from the set of active delay values.

29. The network entity of claim 28, wherein the second control message comprises a downlink control message and the third control message comprises a medium access control-control element (MAC-CE) message.

* * * * *